US012664767B2

(12) United States Patent
Amthor et al.

(10) Patent No.: US 12,664,767 B2
(45) Date of Patent: Jun. 23, 2026

(54) MICROSCOPY SYSTEM AND METHOD FOR TESTING A SENSITIVITY OF AN IMAGE PROCESSING MODEL

(71) Applicant: Carl Zeiss Microscopy GmbH, Jena (DE)

(72) Inventors: Manuel Amthor, Jena (DE); Daniel Haase, Zoellnitz (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 269 days.

(21) Appl. No.: 18/235,508

(22) Filed: Aug. 18, 2023

(65) Prior Publication Data

US 2024/0071057 A1      Feb. 29, 2024

(30) Foreign Application Priority Data

Aug. 25, 2022    (DE) ..................... 10 2022 121 542.3

(51) Int. Cl.
  *G06V 10/776*        (2022.01)
  *G06V 10/70*         (2022.01)
          (Continued)

(52) U.S. Cl.
  CPC .......... *G06V 10/776* (2022.01); *G06V 10/768* (2022.01); *G06V 10/774* (2022.01); *G06V 20/695* (2022.01); *G06V 20/698* (2022.01)

(58) Field of Classification Search
  CPC .. G06V 10/776; G06V 10/768; G06V 10/774; G06V 20/695; G06V 20/698;
          (Continued)

(56) References Cited

U.S. PATENT DOCUMENTS

| | | | | |
|---|---|---|---|---|
| 11,508,045 | B1 * | 11/2022 | Amthor ..................... | G06T 5/94 |
| 2021/0166066 | A1 * | 6/2021 | Ando ................... | G06N 3/0464 |
| 2021/0287661 | A1 * | 9/2021 | Sharma ................. | G10L 13/033 |
| 2022/0222822 | A1 | 7/2022 | Amthor et al. | |
| 2022/0318568 | A1 * | 10/2022 | Quinton ................. | G06F 18/24 |
| 2023/0316593 | A1 * | 10/2023 | Kumar .................... | G06T 11/00 |
| | | | | 706/12 |

(Continued)

FOREIGN PATENT DOCUMENTS

| | | | | |
|---|---|---|---|---|
| DE | 102020207323 A1 | 12/2021 | | |
| DE | 102021100444 A1 | 7/2022 | | |
| WO | WO-2021180663 A1 * | 9/2021 | ........... | G06N 3/0888 |

OTHER PUBLICATIONS

Teodoro et al, "Algorithm sensitivity analysis and parameter tuning for tissue image segmentation pipelines" p. 1064-1072 (Year: 2016).*

(Continued)

*Primary Examiner* — Ming Y Hon
(74) *Attorney, Agent, or Firm* — LaBatt, LLC

(57)        ABSTRACT

A computer-implemented method tests a sensitivity of an image processing model trained using training data which includes microscope images. The training data is also used to form a generative model that can produce a generated microscope image from an input parameter set. The generative model is used to produce a series of generated microscope images by varying at least one parameter of the parameter set. An image processing result is calculated from each of the generated microscope images using the image processing model. A sensitivity of the image processing model to the at least one parameter is then ascertained based on differences between the image processing results.

20 Claims, 8 Drawing Sheets

(51) Int. Cl.
   *G06V 10/774*          (2022.01)
   *G06V 20/69*           (2022.01)

(58) Field of Classification Search
   CPC .... G06V 10/82; G02B 21/365; G06N 3/0464;
                     G06N 3/094; G06T 7/0002; G06T
                     2207/10056; G06T 2207/20081; G06T
                                                      2207/20084
   See application file for complete search history.

(56) References Cited

U.S. PATENT DOCUMENTS

| | | | | |
|---|---|---|---|---|
| 2024/0071057 A1* | 2/2024 | Amthor | ................ | G06V 10/776 |
| 2024/0212326 A1* | 6/2024 | Amthor | ................. | G06N 3/088 |
| 2025/0022096 A1* | 1/2025 | Dong | ........................ | G06T 5/70 |
| 2025/0245384 A1* | 7/2025 | Wadhawan | ......... | G06F 21/6254 |
| 2026/0087259 A1* | 3/2026 | Penberthy | ............... | G06F 40/30 |

OTHER PUBLICATIONS

Search Report for German Patent Application No. 10 2022 121
542.3 (English translation not available), Oct. 4, 2024, 7 pages.

Koh, et al., "Understanding Black-box Predictions via Influence
Functions," Proceedings of the 34th International Conference on
Machine Learning, 2017, 10 pages.
Goodfellow et al., Generative Adversarial Nets, arXiv:1406.2661v1
[stat.ML], Jun. 10, 2014, 9 pages.
Zhou et al., Learning Deep Features for Discriminative Localiza-
tion, 2016 IEEE Conference on Computer Vision and Pattern
Recognition (CVPR), Las Vegas, NV, USA, 2016, pp. 2921-2929.
Zeiler et al., Visualizing and Understanding Convolutional Net-
works, D. Fleet el al. (Eds.): ECCV 2014, Part I, LNCS 8689, 2014,
pp. 818-833.
ZEISS ZEN Intellesis for Materials Science, Product Flyer, May
2018, 2 pages.
ZEISS ZEN Intellesis, Product Flyer, Aug. 2018, 2 pages.
Instruction Manual ZEISS AI Sample Finder, Jan. 2021, 39 pages.
Manser et al., Machine Learning Approaches for Easy and Precise
Image Segmentation, Zeiss ZEN Intellesis Application Note, Jul.
2018, 8 pages.
Glorot et al., Understanding the difficulty of training deep feedforward
neural networks, Proceedings of the 13th International Conference
on Artificial Intelligence and Statistics (AISTATS) 2010, pp. 249-
256.
Gao et al., A Review of Active Appearance Models, IEEE Trans-
actions on Systems Man and Cybernetics Part C (Applications and
Reviews), vol. 40, No. 2, Mar. 2010, pp. 145-158.

* cited by examiner

MICROSCOPY SYSTEM AND METHOD FOR TESTING A SENSITIVITY OF AN IMAGE PROCESSING MODEL

REFERENCE TO RELATED APPLICATIONS

The current application claims the benefit of German Patent Application No. 10 2022 121 542.3, filed on 25 Aug. 2022, which is hereby incorporated by reference.

FIELD OF THE DISCLOSURE

The present disclosure relates to a microscopy system and to a method for testing a sensitivity of an image processing model.

BACKGROUND OF THE DISCLOSURE

The importance of the role of machine-learned image processing models in the processing and analysis of captured microscope images is continuously increasing in modern microscopy systems. Machine-learned image processing models are used, for example, to automatically localize a sample, to classify a sample type, to determine a confluence (i.e., an area covered by biological cells) by image segmentation, or to automatically count a number of cells in a microscope image. Learned image processing models are also employed for the virtual staining of sample structures or for image enhancement, e.g., for noise reduction, resolution enhancement or artefact removal.

In many cases microscope users train such models themselves with their own data. Microscopy software developed by the Applicant allows users to carry out training processes using their own data without expertise in the area of machine learning. This is important as it helps to ensure that the model is suitable for the type of images handled by the user. In addition, efforts are also being made to automate training processes incorporating new microscope data as much as possible. In all of these cases, a quality control of the image processing model is essential once the training of the image processing model has been completed.

Quality control is conventionally carried out with validation data. A provided dataset of microscope images is divided into training data and validation data. The microscope images constituting the training data are used for the iterative adjustment of model weights of the image processing model. After this training has been completed, the microscope images constituting the validation data are entered into the image processing model and the calculated image processing results are compared with predefined annotations (ground truth data). The greater a correspondence between the image processing results and the annotations, the higher a model quality is assumed to be.

A high validation accuracy alone, however, does not guarantee that the image processing model is able to correctly process microscope images that did not form part of the dataset from which the training and validation data were drawn. This issue is explained here using an image processing model that calculates a sample classification as an example. The model is intended to be able to discriminate between a plurality of types of bacteria in order to correctly classify a sample shown in a microscope image. A dataset with corresponding microscope images and respectively predefined class designations is used for the training. The model learns to calculate a class designation based on certain features. This is explained in greater detail with reference to FIG. 1. FIG. 1 schematically shows a lowdimensional feature space spanned by at least two features F1, F2. A representation of a microscope image of the training data in the feature space is called a feature vector 30. A feature vector 30 is represented by a point whose coordinates indicate values for the features F1, F2, . . . . The classification model is intended to learn to assign a correct class designation based on the features F1, F2. In FIG. 1, the feature vectors 30 are represented by circles and squares, which symbolize different predefined annotations. Circles and squares stand for two different types of bacteria in this example. The microscope images were captured on different measurement days D1, D2, D3, wherein the measurement days D1, D2, D3 are distinguished in FIG. 1 by solid, hollow and grey-hatched circles or squares. For example, black solid circles and squares represent feature vectors 30 of microscope images of measurement day D2, while hollow circles and squares represent feature vectors 30 of microscope images of measurement day D1. In this example, the microscope images or feature vectors 30 of the measurement days D1 and D2 are provided for the training and the validation, while the microscope images or feature vectors 30 of the measurement day D3 are only to be processed after completion of the training, in the inference phase.

As can be seen in FIG. 1, the measuring day D1, D2, D3 has a strong effect on the features F1, F2 of a microscope image. The feature vectors 30 of the microscope images of a measuring day D1 thus form an island i1 located at a distance from an island i2 or i3 of feature vectors 30 of the microscope images of another measuring day D2 or D3. Such an undesired correlation with the measurement day can occur, e.g., when an ambient lighting differed on the different measurement days D1-D3. The measurement day thus constitutes an influence (bias), whereby it is no longer possible to reliably calculate a correct class designation from the coordinates of a feature vector. In FIG. 1, although the position of the feature vectors 30 shows that the different types of bacteria differ in the features F1, F2, an influence of the bias "day of capture" is so strong that, without knowledge of the influence of the day of capture, it is impossible to infer a specific type of bacteria. If the training data and validation data for the image processing model (classification model) stem from the dataset of the measurement days D1 and D2, it should ideally be possible to establish with the validation data that the image processing model does not exhibit a high classification accuracy. However, depending on how the data was divided into training and validation data, this is not the case. For example, it can be provided that every tenth microscope image of this dataset is used as a validation image, while the remaining microscope images are used as training data. In this case, microscope images from both islands i1 and i2 are used both for the training data and for the validation data. As a result, a high validation accuracy is established based on the validation data. However, new measurement data of a future measurement day, symbolized by the measurement data of the measurement day D3, form a new island i3 in the feature space, which differs in location from the islands i1-i2 of the training. It will thus not be possible to reliably determine a correct class designation. In principle, it would be possible for this problem to be detected by means of a different division of the dataset into training and validation data. For example, the underlying microscope images of one island, for example of the island i2 of the day of capture D2, could be used exclusively as validation data and not as training data. A poor validation accuracy adequately describing the model quality would be ascertained based on such validation data. However, such a division into training and validation data requires ample expertise and is frequently hard to automate. For example, it would be necessary to know which of the distinguishing characteristics of the microscope images should be decision-relevant and which should not, and these distinguishing characteristics would need to be specified for the training data. Undesirable islands in the feature space can also be caused by numerous other factors besides the day of capture, for example the use of different measurement devices, different device settings, different data processing steps, or different sample preparations or sample origins, in particular in cases of samples from different patients.

With a conventional quality control based on validation data, it is not obvious which data characteristics are decisive for the model in the calculation of the respective image processing result. Merely the correctness of the output image processing result is checked. The question remains, however, whether the image processing result is ascribable to undesired characteristics of the data, for example to the day of measurement.

A quality control based on validation data also generally does not take into account the influence of interfering factors, which are to be expected in reality but which are not covered in a representative manner by the validation data. A good example is image noise, which can differ in reality from the image noise of the validation data in a statistically relevant manner. In such cases, it is not possible based on the validation data to predict whether the image processing model is able to calculate a correct image processing result.

As background information reference is made to: X. Glorot et al. (2010): "Understanding the difficulty of training deep feedforward neural networks". Typical steps in the training and validation of a neural network are described in this article.

A training process for generative adversarial networks is described in: Ian Goodfellow et al (2014): "Generative Adversarial Nets", arXiv:1406.2661v1 [stat.ML] 10 Jun. 2014.

An explanation of why a model provides a certain output is desirable. Conventionally, this is usually derived through a manual analysis of neuron activations. Images from the validation data are used to this end. For example, it is possible to examine which image regions of a given input image are decision-relevant and which model parameters are activated for a given input image, see Zhou, E., et al, "Learning Deep Features for Discriminative Localization", CVPR 2016. However, this approach does not ascertain which factors caused the model decision or to what extent different factors caused the model decision. This weakness also applies to an analysis of the activations of internal output layers whereby it is ascertained which feature maps play an essential role in the model decision, see Zeiler, M. D., et al, "Visualising and Understanding Convolutional Networks" in D. Fleet et al. (Eds.): ECCV 2014, Part I, LNCS 8689, pp. 818-833, 2014, Springer International Publishing Switzerland.

In DE 10 2021 100 444 A1, minimally varied microscope images are produced from a microscope image of the validation data, for example by blurring the image, to test an image processing model. An image processing result is calculated from each of these microscope images. If these image processing results do not essentially correspond, this indicates a low model robustness. However, this approach, although it allows an estimation of the general robustness of the image processing model, is unable to reveal a bias in the training data, such as the bias illustrated in FIG. 1. In addition, it is not ascertained which factors are decision-relevant in the calculation of image processing results.

SUMMARY OF THE DISCLOSURE

It can be considered an object of the invention to provide a microscopy system and a method which can ascertain the sensitivity of a machine-learned image processing model for processing microscope images in a particularly meaningful manner.

This object is achieved by the microscopy system and the method with the features of the independent claims.

In a computer-implemented method for testing a sensitivity of an image processing model, the image processing model is trained to calculate an image processing result from an input microscope image using training data comprising microscope images. The training data is also used to form a generative model that can produce a generated microscope image from an input set of parameters. At least one series of generated microscope images for which at least one parameter is varied is produced with the generative model. An image processing result is respectively calculated from each of the generated microscope images of the series by means of the image processing model. Based on differences between the image processing results, a sensitivity of the image processing model is ascertained for the at least one parameter that was varied in the series of generated microscope images.

A calculated image processing result can take the form of, for example, a classification. It is ascertained by means of the invention which parameters have an essential influence on the calculated classification. While natural microscope images generally simultaneously differ in many characteristics and thus in many parameters, the generative model allows one or more parameters to be modified in a targeted manner and other parameters to be kept constant. It is thus only through the generative model that it becomes possible to capture the effect of a single parameter on the image processing result, e.g. on a classification. Knowing the sensitivity of the image processing model to different parameters enables a superior model testing as well as the ascertainment of optional measures designed to improve the quality of the model. In particular, it is possible to analyze why (namely based on which parameters) an image processing model decides on certain outputs, e.g. on a certain classification. Using the ascertained sensitivity, it is further possible to uncover a bias in the training data, i.e., an undesired influencing factor in the training data. The sensitivity of the image processing model ascertained according to the invention thus provides information regarding the decision-relevant factors in a manner in which conventional testing measures cannot.

The invention further relates to a microscopy system comprising a microscope for image capture and a computing device. The computing device is configured to carry out the method according to the invention.

The computer program of the invention comprises commands that, when the program is executed by a computer, cause the execution of the method according to the invention.

Optional Embodiments

Variants of the microscopy system according to the invention and of the method according to the invention are the object of the dependent claims and are explained in the following description.

To facilitate a better understanding of the invention, example embodiments are first described pertaining to the subject matter of how a generative model produces a generated microscope image from an input set of parameters. It is then explained how the sensitivity of the image processing model to these parameters is ascertained. Next, examples of how ascertained sensitivities can be exploited according to the invention to form higher-quality image processing models are described.

Generative Model

A generative model is formed, in particular estimated and/or trained, using microscope images. The microscope images in question can be constituted by all or at the very least a plurality of the microscope images of the training data of the image processing model. The generative model is intended to be able to produce a generated microscope image from input data. "Input data" here refers to input parameters or a set of parameters that is entered into the generative model. This input data does not consist in microscope images or processed image data. A generated microscope image should resemble the microscope images of the training data, e.g. it should appear to stem from a statistical distribution of characteristics of the microscope images, so that a discrimination program is not able to reliably discriminate between generated microscope images and the microscope images of the training data.

The generative model can be formed in a generally known manner using the microscope images. Different methods for forming the generative model are explained in the following:

A breakdown into (basic) components can be calculated for the microscope images. The microscope images are reproduced by combinations of the basic components. For example, a principal component analysis (PCA) can be employed to break down and determine the basic components. The parameters are multiplied by the basic components and subsequently a sum is formed in order to produce a microscope image, i.e., in order to reproduce a microscope image of the training data. Basic components can also be ascertained by a method based on PCA, for example by active appearance models (AAMs). AAMs can in particular be utilized as described in: Xinbo Gao et al, "A Review of Active Appearance Models", IEEE TRANSACTIONS ON SYSTEMS, MAN, AND CYBERNETICS—PART C: APPLICATIONS AND REVIEWS, VOL. 40, NO. 2, MARCH 2010. The contents of this article, in particular the design of the AAMs, are hereby incorporated herein by reference. Basic components can also be formed through a non-negative matrix factorization (NMF). In an NMF, a given matrix is approximated by a product of two (or more) matrices. The two matrices contain considerably fewer parameters/entries than the given matrix. An independent component analysis (ICA) can also be employed to determine components which in combination can reproduce a microscope image.

The generative model can also be formed by a deep neural network, e.g. by generative adversarial networks (GANs) or by an autoencoder-based model, in particular by the decoder of an autoencoder. The microscope images can be preprocessed for the formation of a generative model. This processing can include, for example, a registration by means of which samples or sample structures are shown in the same position and in the same size or magnification in the microscope images.

The generative model can be calculated automatically or created manually. Manual creation is suitable, for example, when the microscope images can be simulated very well, in particular when objects that do not have a distinctive texture in microscope images are relevant for the image processing. The latter include objects that cannot be resolved by the microscope or only to an insufficient degree, e.g. single molecules, bacteria or beads, i.e., microspheres visible in microscope images that can be coated with specific antigens. In particular single molecules are effectively point sources and are displayed as an impulse response of the system, i.e., as a point spread function (PSF) in the microscope image. The PSF is mostly bell-shaped and has no textures. A manual creation of the generative model can also be advantageous when the image data does not cover all aspects that the image processing model is intended to be able to handle. For example, a manually formed generative model can simulate artefacts, noise or errors that are not present in the original microscope images. This makes it possible to analyze the sensitivity of the image processing model to noise, artefacts or other errors. It can also be useful to form the generative model manually when a semantic interpretation of the parameters would otherwise be difficult, which will be described in greater detail later on.

It is also possible to combine an automatic and a manual design of a generative model. For example, a generative model can first be partially learned using available microscope data. The generative model is subsequently supplemented manually with further parameters which, e.g., replicate further noise variations, sharpness variations or optical imaging errors.

Parameter Configuration

A parameter configuration or defined parameter set is understood to mean that a specific value is defined for each of the input parameters of the generative model. From such a parameter configuration the generative model can calculate a specific generated microscope image. Each microscope image of the training data can be reconstructed by a specific parameter configuration.

The terms "parameter set" and "set of parameters" are used synonymously. Descriptions according to which a parameter set is input into the generative model should be understood to mean that specific values of the parameters of the parameter set, i.e., a specific parameter configuration, are input into the generative model.

The varying of a parameter relates to a value of the parameter in a specific parameter configuration. Multiple parameter configurations are thus produced which differ in the value of at least one parameter while the remaining parameters retain the same value. A series of generated microscope images is produced from these parameter configurations.

The parameter configuration, i.e., the values of the parameter set, can be defined so that a microscope image characteristic of the training data can be produced from this parameter set by entering the latter into the generative model. A characteristic microscope image can be understood as lying within a statistical distribution of image characteristics of the microscope images of the training data.

For example, respective parameter configurations can be calculated for a plurality or all of the microscope images of the training data. These parameter configurations can also be referred to as the latent code or latent space embedding/representation of the microscope images in the feature space of the generative model. If a latent code of a microscope image is entered into the generative model, a generative microscope image is produced from the same, which reproduces the microscope image or at least approximates it as closely as possible. A centroid/average can be calculated from the latent code representations of a plurality or all of the microscope images. This centroid specifies a parameter configuration by means of which a generated microscope image characteristic of the training data can be produced. Alternatively, a latent code representation of a microscope image of the training data that encodes a microscope image characteristic of the training data can be used as the parameter configuration. More generally speaking, a feature vector in the feature space of the generative model that lies within a region in the feature space spanned by latent code representations of microscope images of the training data can be chosen as a defined parameter configuration or parameter set.

In principle, a microscope image can first be selected as characteristic and its latent code representation then used as a defined parameter configuration. The selection of one of the microscope images can occur in a dimensionally reduced feature space different from the feature space of the generative model. For example, a t-SNE (t-distributed stochastic neighbor embedding) can be calculated from the microscope images of the training data. In a t-SNE, each microscope image is represented by a point in a feature space, wherein distances between the points are greater, the greater a difference between the associated microscope images. A central point in this embedding is selected; the associated microscope image is deemed characteristic of the training data and a latent code representation of this microscope image can be used as the parameter configuration.

Variation Range of a Parameter

Different parameter sets are produced from which the generative model produces a series of generated microscope images. In order to produce different parameter sets, it is possible to start with a parameter set and then vary a single parameter or multiple parameters simultaneously.

When a parameter is varied, the values of the varied parameter cover a range. This range lies within a (in particular predefined) variation range, which should be based on the parameter variance found in the microscope images of the training data. In particular in the case of a machine learning model, the parameter variance can be, e.g., ascertained by calculating a respective projection into the feature space of the generative model for a plurality or all of the microscope images of the training data, i.e., by calculating a respective feature vector/latent code representation. A variance in the values of a specific parameter of these feature vectors indicates the parameter variance.

For the production of a series of microscope images, a variation range of the at least one parameter can be set at a value that covers at least 60% or at least 70% of a parameter variation found in the microscope images of the training data. The variation range can in particular be set at 95%, 98% or above 99% of the parameter variation found in the microscope images. In principle, values above 100% are also possible, although this entails a certain uncertainty with regard to how realistic generated microscope images will look. Depending on the chosen parameter configuration, the variation range is not necessarily centered around the chosen parameter value in the parameter configuration.

The determination of the parameter variance using back-projected feature vectors of the microscope images is to be understood merely as an example. It is potentially also possible to derive a parameter variance more directly from the generative model: in a PCA, for example, the variance of the microscope images explained by a principal component is available for each estimated principal component. A variation range for the parameter of this principal component can be derived from this variance.

Varying Multiple Parameters and Producing Multiple Series of Microscope Images

The generative model can also be used to produce multiple series of generated microscope images. The series differ in which parameters are varied or how multiple parameters are varied simultaneously. In particular, each parameter can be varied individually so that a series of generated microscope images is produced for each varied parameter.

If multiple parameters are varied simultaneously, a corresponding parameter configuration or corresponding feature vector in the feature space of the generative model is changed in a direction that can in principle be selected freely. Generally speaking, in order to produce multiple sets of generated microscope images, the feature vector can be changed in different directions of the feature space. For each set of generated microscope images, the feature vector is shifted/changed in a direction of the feature space. If each of these directions of change corresponds to an axis of the feature space, then exactly one parameter is varied for each series. The changes in the feature space can, however, generally run in any direction, wherein different directions (in particular perpendicular to one another) in the feature space are chosen for different series. It is thus also possible for all parameters to be varied simultaneously for each series, wherein the series differ in how the parameters are varied simultaneously. The variation of a single parameter is suitable in particular when the feature space is highly structured, as is the case, e.g., with a generative model generated by a StyleGAN or alias-free GAN.

Suitable directions for a variation of one or more parameters of a parameter configuration can be ascertained from a distribution of the latent code representations of the microscope images of the training data. A variation direction (and variation increment) is suitable when the resulting parameter configuration still lies within the distribution of latent code representations in the feature space of the generative model. A variation direction does not have to be a straight line, but can run along a line of essentially any form in the feature space. For example, a variation direction or variation path can be determined by defining a starting and a target parameter configuration, which both lie within the distribution of the latent code representations of the microscope images of the training data, and then connecting the starting and target parameter configurations by a line. In principle, the line can take the form of a straight line in the feature space. Alternatively, a shortest route between the starting and target parameter configurations can be calculated with a metric that takes into account a density of the latent code representations of the microscope images in the feature space. The higher the density is, the shorter the path or distance. The starting and target parameter configurations are thus connected by a line that runs in the feature space through regions in which a particularly large number of latent code representations are located. This guarantees a series of generated microscope images that look realistic. The starting and target parameter configurations can be back-projections of two microscope images. It is possible to choose two microscope images with different annotations, e.g. different class designations. This produces a series of generated microscope images for which the image processing model should calculate significantly different image processing results (e.g. different class designations).

Alternatively or additionally, the starting and target parameter configurations can be back-projections of two microscope images with the same annotation. These starting and target parameter configurations can be connected by a path in the feature space that runs along feature vectors of microscope images of the training data that also have the same annotation. This produces a series of generated microscope images which should lead to essentially the same image processing results, e.g. the same class designations.

For the sake of simplicity, variants of the invention are often explained using the formulation "by means of at least one varied parameter" when it is possible to produce different series of generated microscope images by varying different parameters. These variants of the invention also comprise the use of different parameter variation directions in the feature space for producing different series of microscope images. The same parameters, in particular all parameters, can be varied for different series of microscope images, wherein the parameter configuration is varied in different directions in the feature space. Different series of microscope images can start from a common parameter configuration or from different parameter configurations.

The determination of a parameter configuration, a variation range and/or a variation direction in the feature space does not necessarily have to occur automatically, but can generally also be implemented semi-automatically or purely manually.

Identifying Decision-Relevant Parameters

If a plurality of parameters are analyzed, it can subsequently be ascertained which parameters are the most decision-relevant for the image processing model.

Multiple series of generated microscope images are first produced by means of the generative model, wherein the series differ in which parameters are varied or how multiple parameters are varied. Image processing results are calculated from the generated microscope images of all series. The image processing results of a series are analyzed to determine how significantly they differ. The greater the differences are, the higher the sensitivity of the image processing model to the associated variation. These sensitivities can be used to identify the parameters to which the image processing model exhibits a greatest sensitivity, i.e., which have the greatest effect on an output of the image processing model.

Parameter Semantics

The generated microscope images of a series can be used to ascertain an effect of the at least one parameter on the production of generated microscope images. The parameter configurations of the generated microscope images of a series differ solely by the implemented variation of at least one parameter, so that the effect or signification of this variation is evident from the generated microscope images of this series.

A parameter semantics can thus be ascertained based on the series of generated microscope images. The parameter semantics specifies a microscope image characteristic that is changed by varying the at least one parameter.

The parameter semantics can be, e.g., a geometric characteristic (e.g., size, shape or orientation) of a depicted sample. A corresponding parameter thus changes the size, shape or orientation of a depicted sample. The parameter semantics can also relate to a number or position of depicted samples, a brightness or brightness distribution of a depicted sample, or a brightness or brightness gradient of a background in which there is no sample.

For each varied parameter, it can be automatically ascertained whether the resulting changes in generated microscope images correspond to one of a plurality of predefined parameter semantics. For example, it can be automatically ascertained which parameter(s) defines a background brightness and which parameter(s) specifies geometric characteristics of a sample.

A background brightness and a sample brightness can be ascertained in an automated manner, for example, by first calculating a segmentation of a generated microscope image according to the classes "sample" and "background/not sample". This can occur, e.g., using a machine-learned image segmentation model. An average pixel brightness is then ascertained for the regions of a generated microscope image that were identified in the segmentation as background or as a sample. This determines the background brightness and the sample brightness. If essentially only the background brightness calculated in this manner changes within a series of generated microscope images, the semantics "background brightness" can be assigned to the at least one parameter varied for this series. It is likewise possible to calculate geometric characteristics automatically using segmentation masks, so that corresponding parameter semantics can be ascertained and assigned in an analogous manner.

In more general terms, it can be respectively stored for a plurality of known parameter semantics which effect the known parameter semantics has on (generated) microscope images. The known parameter semantics can relate to one or more of the following: a sample size, sample shape, sample orientation, sample brightness, sample brightness gradient, sample position, number of samples, sample texture, background brightness, background brightness gradient, depicted background structures, artefacts, contaminations, image distortions, reflections, or geometric characteristics of sample carrier components. A parameter semantics is ascertained by establishing whether differences between the generated microscope images of the same series correspond to precisely one effect of one of the known parameter semantics. If this is the case, the corresponding known parameter semantics can be assigned to the varied at least one parameter.

A parameter semantics can in particular be determined per series of generated microscope images.

Different example embodiments are described according to which a parameter semantics is ascertained using generated microscope images of a series. These are to be understood as an example and variants in which the parameter semantics is already known beforehand are possible.

Sensitivity of the Image Processing Model

A sensitivity of the image processing model to the at least one parameter is understood in the sense that a variation of the at least one parameter has an effect on image processing results of the image processing model. The greater the effect a varied parameter has on the output of the image processing model, the higher the sensitivity. Input data of the image processing model is constituted by generated microscope images calculated from parameter sets produced by varying the at least one parameter.

To summarize, sensitivities can be calculated by: varying parameters, producing associated series of generated microscope images, calculating image processing results (e.g. class designations) from the generated microscope images, and capturing a degree of difference between the image processing results as a function of the respective varied parameter.

The sensitivity of the image processing model to the at least one parameter can be ascertained quantitatively in the form of a degree of difference between the image processing results calculated from generated microscope images produced by varying the at least one parameter. The degree of difference can be captured in particular as a function of the value of the at least one varied parameter.

For example, the image processing model can be a classification model and calculate an image processing result in the form of a probability of a classification, i.e., the probability that a (generated) microscope image belongs to a certain class. If the same class is always or mostly calculated from the generated microscope images produced by varying the at least one parameter, then the degree of difference is zero or low, so that the image processing model has no or a low sensitivity to this parameter. If, on the other hand, the varied parameter has a strong effect on the calculated class probabilities, then the degree of difference is high and the image processing model has a high sensitivity to the varied parameter.

In the case of a binary classification, a respective degree of difference of the model outputs and thus a sensitivity can be calculated in this manner for each varied parameter. In the case of a classification involving more than two classes, a model output comprises a plurality of probabilities in the form of estimates that the generated microscope image belongs to different classes. In this case, the degree of difference can be represented by a trajectory in a multi-dimensional output space. Alternatively, again in the case of a classification involving more than two classes, it is also possible for a curve to be respectively calculated for each output class and optionally displayed. The sensitivity can then be indicated for each output class.

In a regression, the image processing model outputs at least one number, which can have an arbitrary value, if appropriate within a certain number range. In this case, it is possible to display a value graph of the model output as a function of the varied parameter or a related statistic.

In the case of a detection, the image processing model detects at least one predefined object type in the (generated) microscope image. A detection output can in particular take the form of a number, position or size of detected objects. Differences in number, position and/or size can be calculated as one or more degrees of difference. This at least one degree of difference is captured as a function of the varied parameter.

In a segmentation, the degree of difference can be calculated as an extent to which segments vary in shape, size, number and position as well as in their boundaries.

If the image processing model carries out an image-to-image transformation, the degree of difference is ascertained as an extent to which the output images differ. The difference can be determined pixel by pixel and optionally displayed, wherein a value curve is calculated as a function of the varied parameter for each pixel. Alternatively, a single degree of difference can be calculated for the entire content of the images or for an image region consisting of a plurality of pixels. This difference can be quantified automatically by an evaluation model. It is also possible for a difference between spatial averages of the output images to be calculated. The spatial average can correspond to an average pixel brightness of an image. The average pixel brightnesses of the output images or a difference in the average pixel brightnesses is plotted versus the at least one varied parameter. In cases where a degree of difference is ascertained for an image region, a plurality of degrees of difference can be calculated for different image regions that form, e.g., an N×N grid. Alternatively, a degree of difference between output images can be calculated by means of a structure-based analysis, e.g. by segmenting relevant regions and then calculating differences between segments from different images, wherein the differences can be captured with regard to shape, size, number, position and/or boundaries of the segments.

The calculated sensitivities or degrees of difference as a function of the varied parameters can optionally be displayed to a user. A visualization can take the form of a graph of the respectively calculated degree of difference, in particular as a function of the value of the varied at least one parameter, or as a function of a numeration of the generated microscope images used. The numeration specifies a sequence of the generated microscope images in which the at least one parameter is varied.

Analysis of the Sensitivity

An ascertained sensitivity can in principle be analyzed manually and/or automatically. Optionally, an ascertained parameter semantics can be taken into account in the analysis.

In order to take the parameter semantics into account, an intended sensitivity of the image processing model to parameters of a predefined parameter semantics can first be defined. This defines an intended effect of a specific microscope image characteristic on the calculation of image processing results. A comparison is then carried out to determine whether an ascertained sensitivity of one or more parameters whose ascertained parameter semantics matches the predefined parameter semantics corresponds to the intended sensitivity. A warning is issued if the ascertained sensitivity does not correspond to the intended sensitivity.

In a concrete example, it can be established that a certain image processing model should classify sample types and that the classification result should not depend on an image noise behavior, a background brightness or potentially depicted background structures. In this case, it is defined that an intended sensitivity of the image processing model to the predefined parameter semantics "image noise behavior", "background brightness" and "background structures" should ideally be zero. Different parameters are varied and parameter semantics of the varied parameters are ascertained based on the associated series of generated microscope images. The parameter or parameters are identified whose ascertained parameter semantics match one of the predefined parameter semantics "image noise behavior", "background brightness" or "background structures". Sensitivities of the image processing model to these parameters are ascertained and compared with the predefined sensitivities. In event of a discrepancy, a warning is issued, which in this example indicates that the classification depends on the image noise behavior, the background brightness or background structures, which is not desired.

An analysis of a sensitivity or a comparison of the sensitivity with an intended sensitivity can be carried out automatically or manually and can relate in particular to one or more of the following factors:

detecting (non-)linear changes in a curve indicating the image processing results as a function of the varied parameter. A number of inflection points of this curve can also be captured.

detecting abrupt changes or jumps in the aforementioned curve, as opposed to a smooth curve. It is also possible to take into account slopes of the curves and to compare them, e.g., with predefined threshold values.

ascertaining whether there are any changes at all or periodic changes between image processing results for the microscope images of the same series.

ascertaining a symmetry behavior of the image processing results under the parameter variation. Often a change in the image processing result should be symmetrical to a change in the generated microscope image brought about by the parameter variation. For example, a shift in image content in generated microscope images in the same/symmetrical manner should yield a shift in a calculated image processing result such as a segmentation mask or in an output image.

Optionally, some of the varied parameters are pre-selected according to the above criteria and either undergo further analysis automatically or are proposed to a user for manual analysis. A varied parameter can be selected, e.g., when the curve that indicates differences between image processing results as a function of the associated varied parameter has conspicuous sections (for example jumps) or varies over a particularly large interval.

For a manual analysis of the sensitivity, the curve indicating differences between image processing results as a function of the associated varied parameter can be displayed together with the generated microscope images from which the image processing results were calculated. It is optionally possible for an interactive configuration option to be provided by means of which a user can change a value of the varied parameter. With the generative model and the image processing model, the corresponding generated microscope image and the image processing result calculated therefrom are generated and displayed directly.

Verification that the Image Processing Model Responds to Known Discriminating Factors It is possible for discriminating factors to be known which should determine the image processing result. It is likewise possible for factors to be known which should have no effect on the image processing result. The sensitivity and parameter semantics can be used to verify that the known discriminating factors are indeed the influencing factors/deciding factors that determine the image processing result. It can also be verified that no undesired influence (bias) is exerted by certain factors for which it is known that they should have no effect. For example, in a cell state classification, the cell morphology should have the greatest influence, while the background brightness should have no influence or at least hardly any influence on the calculated classification.

In more general terms, there can occur, based on the ascertained sensitivity, a categorization of whether or not the associated varied parameter is a discriminating factor for calculating the image processing result. The categorization can take the form of a yes/no or of a score. A respective parameter semantics is ascertained for varied parameters in the described manner. A specification is stored for different parameter semantics whether an associated parameter should be a discriminating factor for calculating the image processing result. It is checked whether there is a contradiction between a parameter categorized as a discriminating factor and a specification stored for the corresponding parameter semantics. In the event of a contradiction, a warning is output.

The parameter semantics can comprise, e.g., one or more of the following: a background brightness; an image or background sharpness; an image noise; a geometry, number, size, position and/or arrangement of depicted objects; a texture of depicted objects; contaminations, artefacts or reflections.

It is stored for each parameter semantics whether the parameter should be a discriminating factor for the calculation of the image processing result. What should constitute a discriminating factor can depend on the image processing model. For example, in tumor diagnosis, the shape of a certain cell type can be a discriminating factor whereas, for a model that simply classifies whether or not cells are present in the image, the shape of the cell type should not be a discriminating factor or should at most be merely a weakly discriminating factor.

In the event of a contradiction between a parameter categorized as a discriminating factor and a specification stored for the corresponding parameter semantics, an augmentation of the training data can be recommended, as described in greater detail later on.

Dependence of the Sensitivity on the Variance in Generated Microscope Images

It is possible to verify based on the sensitivity that parameters that cause less variance in the (generated) microscope images also influence the image processing result less. For example, as a rule, an image processing model should exhibit no sensitivity or merely a low sensitivity to image noise. A parameter that relates to image noise results in less variance in the generated microscope images than other (decision-relevant) parameters. It is thus possible for an automated analysis to be carried out in a simple manner based on the variance.

In some generative models, e.g. when they are based on PCA, the basic/principal components are already sorted according to how large the proportion of the variance of the microscope images of the training data is that is explained by means of the respective basic/principal component. With these generative models, the parameters are thus already sorted in an order according to their respective contribution to the variance in the microscope images. The sensitivity should decrease according to this descending order. If this is not the case, a warning can be issued.

In a related embodiment, a variance is respectively ascertained for each series of generated microscope images which specifies an extent to which image content differs between the generated microscope images of the same series. Based on the ascertained variances, it is then possible to ascertain the varied parameters that result in the smallest variances. It is then checked whether the varied parameters that result in the smallest variances also have a smallest effect on the image processing result, i.e., a smaller effect than the (majority of) other varied parameters.

Plausibility Check of Image Processing Results

Whether plausible image processing results are produced can be estimated using parameters that exhibit the same behavior in the model output when the parameters are varied. For example, the generated microscope images or associated parameter semantics can be automatically compared with one another or displayed side by side for a manual comparison.

In other words, parameters can be identified for which a similar sensitivity is ascertained. An estimation of the plausibility of the similar sensitivity is then carried out by means of a comparison of the microscope images produced during the variation of the identified parameters.

Sensitivity to Structures or to a Morphology

Using the ascertained sensitivities, it is possible to examine whether it is rather a structure (texture) or a morphology (geometry) that is decisive for the calculation of the image processing result. It can in particular be ascertained whether the parameters categorized as discriminating factors represent textures or geometries of depicted objects in microscope images. To make this distinction, differences in the microscope images of a series are ascertained. If the differences relate to, e.g., positions or shapes of depicted objects, the parameter in question relates to a morphology/geometry characteristic. If, on the other hand, these geometry characteristics are identical within a series and a difference is found in the texture within an object, then the corresponding varied parameter encodes structures/textures. This knowledge is particularly relevant when it is known whether the structure or the morphology is more relevant for the defined task of the image processing model.

Augmentation

In an augmentation, new microscope images are produced, generally computationally, and added to the training data for a new training.

An augmentation can be recommended as a function of the ascertained sensitivity of the image processing model. It is possible for a corresponding recommendation to be output to a user or in principle for the augmentation to be implemented in an automated manner.

An augmentation can be recommended, e.g., as a function of whether a parameter has been categorized as a discriminating factor. Image variations due to discriminating factors should be covered as well as possible in the training data. The augmentation can also be recommended as a function of a variance of the latent code representations of the microscope images of the training data, wherein the variance is calculated in the direction of the parameter categorized as a discriminating factor in the feature space of the generative model. Instead of the variance, it is also possible to take into account a number or density of latent code representations of the microscope images along the direction of the aforementioned parameter in the feature space. For image variations that are due to decision-relevant factors, a density of the training data should be as high as possible. An augmentation can also be recommended for a parameter configuration in which a parameter variation causes a particularly large change in the degree of difference between resulting image processing results. A density of training data should be as high as possible in a region in the feature space around this parameter configuration. Parameter configurations within this range can thus be (randomly) generated and converted into generated microscope images by means of the generative model, the generated microscope images then being used as additional training data for the image processing model.

An augmentation is also suitable when a parameter has been categorized as a discriminating factor, but it is stored for the corresponding parameter semantics that this parameter should not be a discriminating factor. As a rule, parameters with the semantics "image noise" or "background brightness", e.g., should not be discriminating factors. It is possible for a plurality of generated microscope images to be produced which differ solely in the parameter that has been categorized as a discriminating factor of the image processing model although a high-quality image processing model should not discriminate using this parameter. The same annotation can optionally be assigned to these generated microscope images. The annotations are used as target results in the training of the image processing model and can be, e.g., a class designation that is identical for the microscope images in question. The annotation can also be, e.g., a segmentation mask, which is created manually, automatically or semi-automatically and is then adopted for all of said microscope images. This augmentation increases the probability that the parameters in question will no longer be discriminating factors for the image processing model following a new training.

Image Processing Model

The image processing model to be tested can be designed for, inter alia, regression, classification, segmentation, detection and/or image-to-image transformation. The image processing model can in particular be configured to calculate at least one of the following as an image processing result from at least one microscope image:

a predication regarding whether certain objects are present in the microscope image. This can include an object or instance re-identification by means of which it is in particular checked whether an object, an object type or an object instance identified in one microscope image is also depicted in other microscope images.

an inverse image transformation by means of which an inverse of a given image transformation is estimated.

geometric specifications relating to depicted objects, e.g. a position, size or orientation of an object; an identification, a number or characteristics of depicted objects. It is in particular also possible to determine a confluence, i.e., a proportion of the area of the microscope image that is covered by objects of a certain type.

a warning regarding analysis conditions, microscope settings, sample characteristics or image characteristics. Microscope settings can relate to, e.g., the illuminance or other illumination settings, detection settings or a focus.

an anomaly or novelty detection. If the entered microscope image differs significantly from the microscope images of the training, an anomaly or a novelty vis-à-vis the training data is determined. The image processing model can also function as a watchdog and issue a warning in the event of discrepancies that are not predefined.

a control command, a recommendation of a control command for controlling the microscope or a microscope component, or a command/recommendation to carry out a subsequent image evaluation. The control command can relate to, e.g., a change in illumination, detection, image capture, focus, sample stage position, filters in use or the objective in use. The control command can also relate to auxiliary components in use, such as an immersion device or an adaptive optic, in particular a spatial light modulator (SLM) by means of which a wavefront is modified. A certain image evaluation can be recommended or commanded, e.g., as a function of which objects were ascertained in the microscope image. The control command can also relate to an AutoCorr setting, so that a correction ring of the objective is adjusted in order to compensate in particular aberrations.

a determination of capture parameters with which a subsequent microscope image is to be captured.

a parameter determination for a calibration, e.g. determining a position of and/or orienting at least one camera.

a specification regarding future maintenance (predictive maintenance). This can in particular be a specification of whether a particular microscope component has been subjected to wear and/or a recalibration will be necessary.

a model test result by means of which another image processing model or its output is tested, for example a model designed by Auto ML. This model can correspond to one of the image processing models described in the present disclosure. In cases of a testing of a model output, a correction of the model output can also be recommended.

an output image in which, e.g., depicted objects are more clearly visible or are depicted in a higher image quality, or an output image in which a depiction of certain structures is suppressed. The improved visibility or higher image quality can relate to depicted objects in general, as in the case of, e.g., a noise reduction (denoising), resolution enhancement (super-resolution), contrast enhancement (e.g. an adjustment of the gamma value or a contrast spread) or deconvolution. The improved visibility can, however, also relate alone to specific objects, as in the case of a transformation between different contrast types, whereby a virtual staining of specific structures is achieved. For example, the transformation can occur between the contrast types bright field and DIC (differential interference contrast). A suppression of structures can occur, e.g., through an artefact removal or through a detail reduction of a background. The artefact reduction does not necessarily have to relate to artefacts already present in captured raw data, but can also relate to artefacts that are created through image processing, in particular in cases of a model compression. A model compression simplifies a machine learning model in order to reduce the memory or computational requirements of the model, wherein the model accuracy can be slightly reduced and artefacts can occur as a result of the model compression. An image-to-image transformation for calculating the output image can also relate to a filling-in of image regions (inpainting), e.g. a filling-in of flaws or gaps as a function of surrounding image content. The output image can also be a density map of depicted objects, e.g. by marking cell or object centers. A white balance, an HDR image or a de-vignetting can also be calculated. A white balance removes a distorting color or hue from the input microscope image so that objects that are actually colorless are depicted as colorless in the output image. In an HDR image, a scale of possible brightness differences per color channel is increased compared to the input microscope image. De-vignetting removes an edge shading of the input microscope image or in general other effects that increase towards the edge of the image, such as a change in color, imaging errors or a loss in image sharpness. A signal separation ("unmixing") is also possible in which one or more signal components are extracted, e.g. in order to estimate an extraction of a spectral range from a captured image. The image processing model can also comprise a generator of a GAN, e.g. of a StyleGAN.

a classification result that specifies a categorization into at least one of a plurality of possible classes as a function of a depicted image content of the microscope image. Different classes can relate to, e.g., the sample type, the sample carrier type or characteristics of the same, e.g. a size or number of certain objects or sample components. The presence of objects in the microscope image or in certain image regions can also be checked. Objects can comprise, e.g., cells, viruses, bacteria, parts of the same or particles. It is also possible to classify an object status, e.g. a cell stage, wherein it is in particular possible to discriminate between living and dead cells. The classes can also relate to microscope characteristics, microscope components or a capture type or an aptness for subsequent measuring and/or processing steps. The classification result can also relate to an input into the model in the form of a point cloud. The point cloud represents measurement results or feature vectors of microscope images in a dimensionally reduced feature space. The classification can also be a quality assessment, e.g. regarding the image capture or an image processing step carried out beforehand. A classification can optionally take the form of an ordinal classification in which a plurality of possible classes form an order, e.g. in the case of a quality assessment of sample carriers or a size estimation of depicted objects. A one-class classification is also possible in which it is estimated whether a certain class is present without defining another class in more detail. In all examples, a probability of class membership is specified. In particular in the case of an ordinal classification, it is also possible to estimate an intermediate result between predefined classes. The classifications mentioned in the foregoing can optionally be implemented via an "open set classification" in which it is detected whether input data stems from a distribution of the training data and can thus be assigned to one of the known classes, or whether it pertains to a new class that was not taken into account in the training of the model.

a regression result, which in principle can relate to the examples mentioned with respect to a classification or to, e.g., a determination of a fill level for sample vessels, a focus determination, an image quality determination or a height determination for multi-well plates, other sample carriers or other objects.

a light field calculation by means of which a 3D image of the sample is estimated from at least one input microscope image or input image data.

a segmentation, in particular a semantic segmentation or instance segmentation, or a detection of certain structures, e.g. of: a sample area, different sample types or sample parts, one or more different sample carrier areas, a background, a microscope component (e.g. holding clips or other parts for holding a sample carrier) and/or artefacts. A segmentation can occur by means of an interactive segmentation in which a user selects, in a one-off selection or in a number of iterations, image regions in the microscope image which should or should not belong to an object to be segmented. The segmentation can also be a panoptic segmentation in which a semantics and an instance of segmented objects is indicated. A detection can be understood as a specification of whether one or more of the aforementioned structures are present in the image, or as a specification of a location of one or more of said structures, wherein a specification of location can occur by means of image coordinates or, e.g., by means of a frame around the corresponding structure, which is generally called a bounding box. Specifications of size or other geometric object characteristics can also be output by the detection in a list.

a data reduction, by means of which a compressed representation of the entered at least one microscope image is produced. The data reduction can in particular take the form of a sparse or compressed representation (compressed sensing).

a model compression of a machine learning model by means of which the model is simplified. It is possible to attain, for example, a runtime improvement by means of a parameter reduction. The model to be compressed can in particular correspond to one of the image processing models described in the present disclosure.

a model selection: It is ascertained which of a plurality of machine learning models is to be used for a subsequent analysis or image processing.

an evaluation of a machine learning model or of a model architecture of a machine learning model, after completion of a model training or during a still ongoing model training (training observer).

an evaluation of a model output of an image processing model in order to calculate a refinement of model parameters of the image processing model by means of continuous active learning.

training data for a further machine learning model. The training data in question can be constituted by any of the outputs mentioned here.

a supervision result of a workflow of a microscope. Image data can be assessed to check whether certain events have occurred, e.g. whether a general or specific sample carrier or a calibration object has been placed on a microscope stage. Spectrogram data of captured audio data or other representations of audio data can also be evaluated for the supervision of a workflow.

a confidence estimate of an image processing result of another image processing model, which can correspond, e.g., to one of the image processing models described in the present disclosure.

a selection of images from an image dataset, wherein selected images resemble the entered microscope image (image retrieval).

Training data of the image processing model can be chosen according to the aforementioned functions. The training data can contain microscope images or images derived from the same, which act as input data for the image processing model. In a supervised learning process, the training data also comprises predefined target data (ground truth data) with which the calculated image processing result should ideally be identical. For a segmentation, the target data takes the form of, for example, segmentation masks. In the case of a virtual staining, the target data takes the form of, e.g., microscope images with chemical staining, fluorescence images or generally microscope images captured with a different contrast type than the microscope images to be entered.

Architecture of the Image Processing Model

In principle, an architecture of the machine-learned image processing model can take any form. It can comprise a neural network, in particular a parameterized model or a deep neural network containing in particular convolutional layers. The image processing model can include, e.g., one or more of the following:

encoder networks for classification or regression, e.g. ResNet or DenseNet; • generative adversarial networks (GANs) • encoder-decoder networks, e.g. U-Net; • feature pyramid networks; • fully convolutional networks (FCN), e.g. DeepLab; • sequential models, e.g., recurrent neural networks (RNN), long short-term memory (LSTM) or transformers; • fully connected models, e.g. multi-layer perceptron networks (MLP); • decision trees or a random forest made up of a plurality of uncorrelated decision trees; • a support vector machine.

General Features

Machine learning models generally designate models that have been learned by a learning algorithm using training data. The models can comprise, for example, one or more convolutional neural networks (CNNs), wherein other deep neural network model architectures are also possible. By means of a learning algorithm, values of model parameters of the model are defined using the training data. A predetermined objective function can be optimized to this end, e.g. a loss function can be minimized. The model parameter values are modified to minimize the loss function, which can be calculated, e.g., by gradient descent and backpropagation.

The microscope can be a light microscope that includes a system camera and optionally an overview camera. Other types of microscopes are also possible, for example electron microscopes, X-ray microscopes or atomic force microscopes. A microscopy system denotes an apparatus that comprises at least one computing device and a microscope.

The computing device can be designed in a decentralized manner, be physically part of the microscope or be arranged separately in the vicinity of the microscope or at a location at any distance from the microscope. It can generally be formed by any combination of electronics and software and can comprise in particular a computer, a server, a cloud-based computing system or one or more microprocessors or graphics processors. The computing device can also be configured to control microscope components. A decentralized design of the computing device can be employed in particular when a model is learned by federated learning using a plurality of separate devices.

Descriptions in the singular are intended to cover the variants "exactly 1" as well as "at least one". The image processing result calculated by the image processing model is thus to be understood as at least one image processing result. For example, an image processing model for virtual staining can be designed to calculate a plurality of differently stained output images from one input microscope image. A segmentation model can also be designed to calculate a plurality of different segmentation masks from one input microscope image. Descriptions of "a/the (varied) parameter" are also to be understood in the sense of "at least one (varied) parameter".

A microscope image can be formed by raw image data captured by a microscope or be produced through further processing of the raw image data. Further processing can comprise, e.g., changes in brightness and contrast, an image stitching to join together single images, an artefact removal to remove faults from the image data, or a segmentation to produce a segmentation mask. Different sections of a single raw image can also be used as a plurality of smaller microscope images.

The characteristics of the invention that have been described as additional apparatus features also yield, when implemented as intended, variants of the method according to the invention. Conversely, a microscopy system or in particular the computing device can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EXAMPLE EMBODIMENTS

Different example embodiments are described in the following with reference to the figures.

FIG. 2

Figure 2:
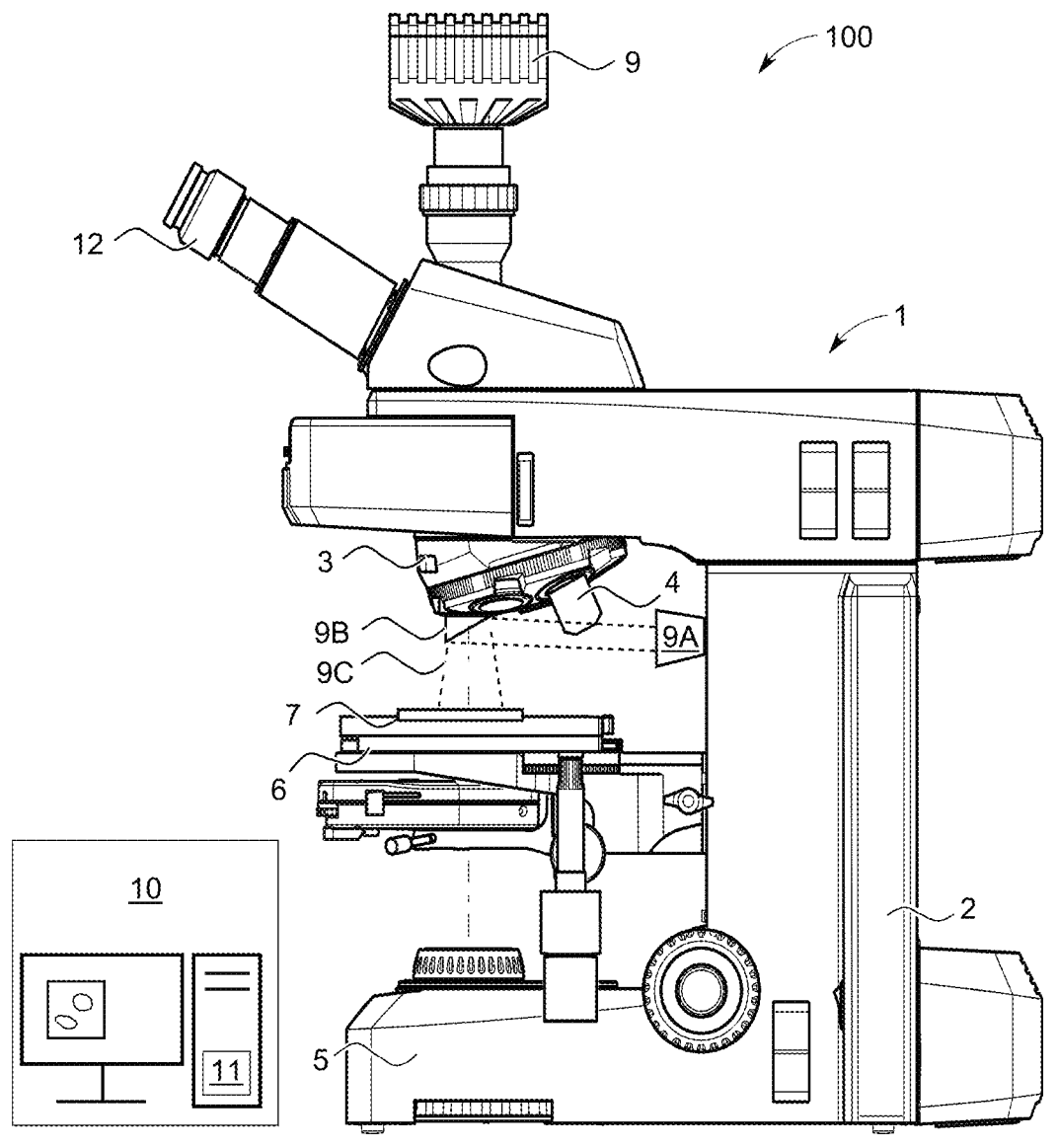
FIG. 2 is a schematic illustration of an example embodiment of a microscopy system according to the invention.

FIG. 2 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 9. When the objective 4 is pivoted into the light path of the microscope, the microscope camera 9 receives detection light from an area in which a sample can be located in order to capture a sample image. A sample can be to be any object, fluid or structure. In addition to or instead of the microscope camera 9, it is also possible to use an eyepiece 12. The microscope 1 optionally comprises an additional overview camera 9A for capturing an overview image of a sample carrier 7. A field of view 9C of the overview camera 9A is larger than a field of view of the microscope camera 9. In the illustrated example, the overview camera 9A views the sample carrier 7 via a mirror 9B. The mirror 9B is arranged on the objective revolver 3 and can be selected instead of the objective 4.

In the present disclosure, microscope images are understood to be raw data captured by the microscope or image data processed therefrom, which can originate from the overview camera 9A or the sample camera/system camera 9.

The microscope images are intended to be processed by a machine-learned image processing model. This model can be executed by a computer program 11 that forms part of a computing device 10. The choice or design of training data of an image processing model largely determines how well the image processing model functions. However, it is not possible with conventionally employed validation measures to satisfactorily verify which characteristics a learned image processing model uses to calculate a certain result. A high accuracy of an image processing model with validation data is insufficient to infer that the model exhibits an adequate robustness. It is thus necessary to verify vis-à-vis which characteristics of the microscope images the image processing model has a high sensitivity. This is explained in the following with reference to the following figures.

FIG. 3

Figure 3:
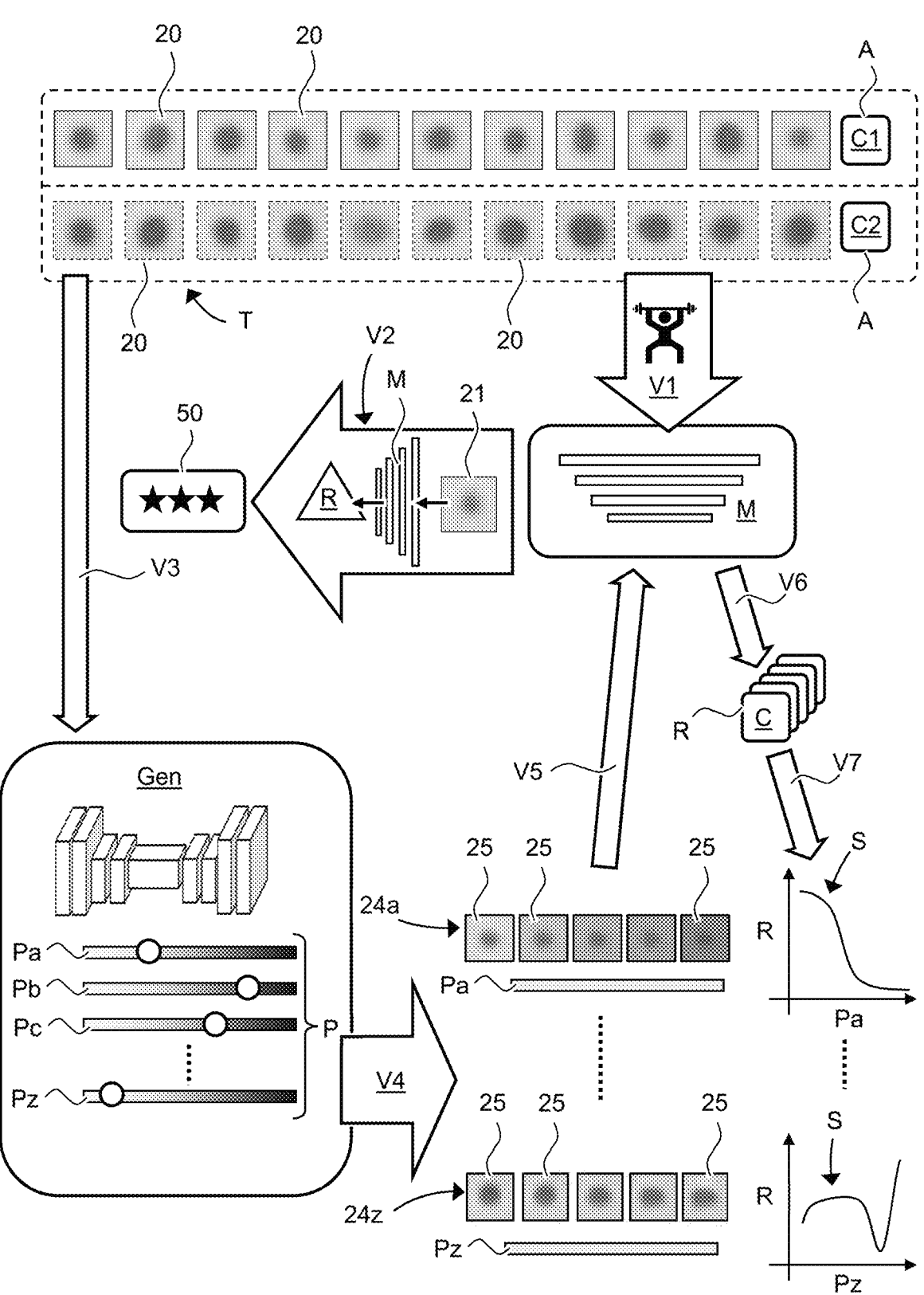
FIG. 3 schematically illustrates processes of an example embodiment of a method according to the invention.

FIG. 3 schematically illustrates processes of an example embodiment of a method according to the invention. The computing device 10 or the computer program 11 mentioned with reference to FIG. 2 are designed to carry out this method.

Training data T for an image processing model M comprises a plurality of microscope images 20. For a supervised or partially supervised learning process, annotations A are provided for at least a portion of the microscope images 20. In the illustrated example, annotations A are assigned to the microscope images 20 in the form of different class designations C1, C2. The class designations C1, C2 can designate, by way of example, a sample type (e.g. a specific type of bacteria or virus) depicted in the microscope images.

By means of the training data T, a training V1 of the image processing model M is carried out in an essentially known manner. Upon completion of the training V1, the image processing model M should be able to calculate an ideally correct class designation from an input microscope image. It is generally also possible for the image processing model M to be trained to output other image processing results, to which end other annotations A are used accordingly, as was explained in greater detail in the foregoing general description.

Figure 1:
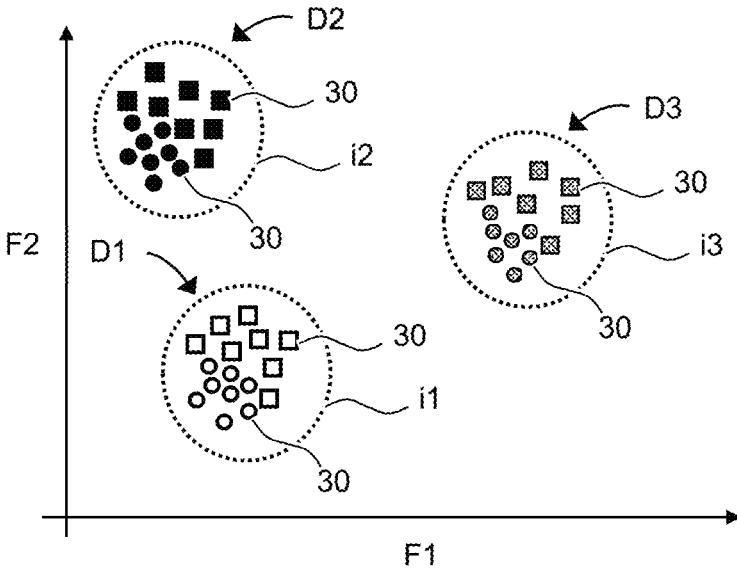
FIG. 1 is a schematic illustration of an embedding of microscope images in a feature space.

A training success can be tested by means of a validation V2 in a likewise essentially known manner. In the validation V2, microscope images 21 that were not used in the training V1 are input into the image processing model M, which calculates image processing results R therefrom, i.e., class designations in this example. A correspondence between the calculated class designations and predefined correct class designations of the microscope images 21 is determined. The higher the correspondence is, the better an output validation result 50. In this known approach, however, it is not possible to detect different problems as the result of which the image processing model M can have an inadequate quality in spite of a calculated excellent validation result 50. Potential causes of problems were discussed with reference to FIG. 1. For example, the image processing model M could learn to assign a class designation based primarily on an unsuitable image characteristic when the microscope images of different classes inconveniently happen to differ in this unsuitable image characteristic, e.g. in noise behavior, image sharpness or a background brightness. If the validation data stems from the same distribution, the image processing model M will also be able to estimate a correct class designation of the validation data based on the noise behavior, the image sharpness or the background brightness, so that a good validation result 50 is obtained. However, as soon as microscope images with a different noise characteristic, image sharpness or background brightness are to be classified, the image processing model M will end up attaining an accuracy that is considerably reduced.

The present invention makes it possible to demonstrate which characteristics of the microscope images are decisive for the image processing model M in the calculation of the image processing result R. It is thus possible to detect whether a ready-trained image processing model M calculates a classification based on undesirable characteristics (e.g. background brightness) or based on potentially suitable characteristics (e.g. shape of a depicted object). The processes carried out to this end are described in greater detail in the following.

In a process V3, a generative model Gen is formed using a plurality or all of the microscope images 20 of the training data T. The generative model Gen is thus able to calculate a generated microscope image 25 from an input parameter set P containing a plurality of parameters Pa-Pz. This generated microscope image 25 resembles the microscope images 20, so that it is ideally not possible or hardly possible to distinguish whether an image is a microscope image 20 or a generated microscope image 25. The design and the forming of the generative model Gen can again occur in an essentially known manner. Examples based on PCA or NMF are described in greater detail later on. Furthermore, the generative model Gen can also be formed by at least one deep neural network, such as in the case of a StyleGAN.

Image characteristics of a generated microscope image 25 depend on the values of the parameters Pa-Pz. Varying the value of at least one of the parameters Pa-Pz can accordingly change an image characteristic of a generated microscope image 25. In a process V4, the generative model Gen thus produces a series 24a of microscope images 25 which differ in the value of the parameter Pa. Each of the remaining parameters Pb-Pz has the same value for all microscope images 25 of this series 24a. By means of such parameter variations, the generative model Gen produces multiple series 24a-24z of microscope images 25; for each series 24a-24z, a different parameter is varied among the parameters Pa-Pz. It is in principle possible to simultaneously vary multiple parameters Pa-Pz for one of the series 24a-24z.

In the illustrated example, the parameter Pa decisively influences a background brightness in the generated microscope images 25. On the other hand, the parameter Pa exhibits no influence or merely a minimal influence on a depicted sample, here a bacterium.

The parameter Pz influences, by way of example, a shape of depicted objects. Varying the parameter Pz thus produces generated microscope images 25 which differ in the shape of the depicted object/bacterium while other image characteristics remain essentially unchanged.

In a process V5, each of the generated microscope images 25 is entered into the image processing model M, which respectively calculates an associated image processing result R in a process V6. In this example, calculated image processing results R take the form of a class designation C for each of the generated microscope images 25. The class designation C is output as a probability of a class membership. In the case of a binary classification, the class designation C can assume, e.g., any value between a minimum value and a maximum value. The minimum value indicates a minimum probability of the presence of the first class (or a maximum probability of the presence of the second class). An increasing value up to the maximum value indicates an increasing probability for the first class and accordingly a shrinking probability for the second class.

In a process V7, a sensitivity S of the image processing model M is ascertained:

The calculated class designations C or image processing results R calculated from the microscope images 25 of the series 24a are plotted against the parameter Pa that was varied to produce the microscope images 25 of this series 24a. The image processing results R as a function of the varied parameter Pa can be displayed as a graph. The change in the image processing results R as a function of the varied parameter Pa is a measure of the sensitivity S. If very different image processing results R are calculated as a function of the value of the parameter Pa, the image processing model M is very sensitive to this parameter Pa.

In the illustrated example, the image processing model M exhibits a high sensitivity S to the parameter Pa: The image processing result R depends strongly on the value of the parameter Pa. A high probability of belonging to the first class is calculated for small values of Pa, wherein this probability becomes monotonically smaller and smaller as the value of the parameter Pa increases. Since the parameter Pa determines the background brightness of generated microscope images 25, this means that a classification (here a division into one of two bacteria types) is strongly dependent on the background brightness. The image processing model M has apparently learned to discriminate microscope images 20, 21, 25 using the wrong concept. If microscope images of another dataset are classified, the background brightness is unlikely to be a suitable criterion.

For each series 24a, . . . 24z of generated microscope images 25, the sensitivity S of the image processing model M to the parameter varied in the series is ascertained. The sensitivity S to a variation of the parameter Pz is shown by way of example. The calculated class designation C or image processing result R does not depend monotonically on the value of the parameter Pz. Instead, the class designation C fluctuates and abruptly switches between the two classes within a set of high values of Pz that lie close together. An extreme change in the estimated class designation C for microscope images 25 that are very close in appearance indicates that an incorrect dependence of the image processing result R on the parameter Pz has been learned. In particular, since the parameter Pz encodes the shape of depicted objects/bacteria, multiple jumps in the displayed curve of the sensitivity S should not occur, in particular not within a small range of values of the parameter Pz.

The described examples serve to illustrate that the sensitivity S is an advantageous measure for evaluating or analyzing a ready-trained image processing model M.

It is also possible to utilize, instead of the image processing result R, a degree of difference between the image processing results R calculated for the microscope images 25 of the same series 24a. That is to say that a sensitivity S is ascertained in the form of a degree of difference between the image processing results R as a function of the varied parameter. This facilitates the comparison of complex image processing results, e.g. output images, by calculating a difference or degree of difference between two output images as a single number. In cases where an image processing result takes the form of a class designation C, on the other hand, the image processing results R can be displayed as a function of the varied parameter Pa or as a degree of difference (e.g. the image processing result R minus the image processing result for a reference value of Pa).

A visual display is useful when an analysis of the sensitivity is carried out by a user. An automatic analysis or evaluation of the sensitivity can also occur, however, in which case a visual display can be omitted.

FIG. 4

Figure 4:
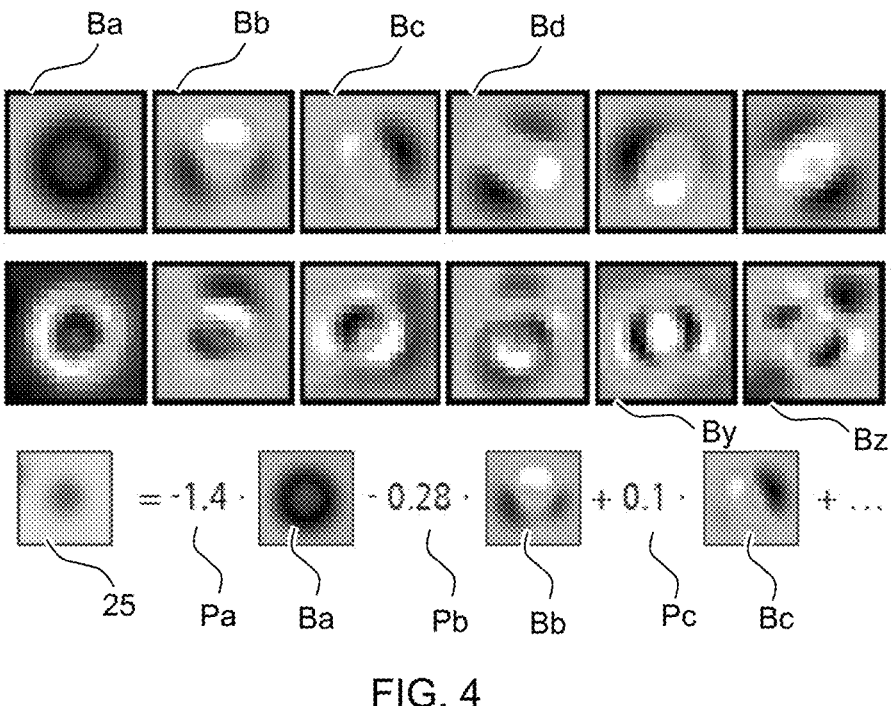
FIG. 4 illustrates processes of a generative model of example embodiments of methods according to the invention.

FIG. 4 schematically illustrates how the generative model of FIG. 3 can be formed by means of a PCA (principal component analysis) and how generated microscope images can then be produced.

Using the microscope images of the training data, a plurality of bases or basic components Ba to Bz are generated by means of the PCA. Each basic component Ba-Bz is an image and a (linear) combination of the basic components Ba-Bz makes it possible to reproduce one of the microscope images of the training data, i.e., to produce a new, generated microscope image. For example, numerical values can be indicated for the parameters Pa, Pb, Pc, . . . . The numerical values of these parameters Pa, Pb, Pc, . . . are multiplied by the basic components Ba, Bb, Bc, . . . and then the sum is formed. This sum is a generated microscope image 25. The pixel values of the basic components Ba-Bz are established within the framework of the PCA based on the available microscope images.

A parameter configuration or a parameter set can be understood as the numerical values of the parameters Pa, Pb, Pc, . . . . Such a parameter configuration encodes a specific generated microscope image, i.e., represents an approximation of one of the microscope images of the training data. Within the framework of the PCA, it is possible to ascertain the parameter configurations that approximate the different microscope images of the training data.

The parameter variation described with reference to FIG. 3 in relation to the process V4 can begin with a specific (starting) parameter configuration. A parameter configuration that approximates one of the microscope images of the training data, as ascertained in the framework of the PCA, can be used as the starting parameter configuration. Beginning with this starting parameter configuration, the value of at least one of the parameters Pa, Pb, Pc, . . . is progressively modified. With each modification, a new parameter configuration is created for which the generative model calculates a generated microscope image. The modifications can occur in both a positive and a negative direction, centered or decentered around the starting parameter configuration.

Instead of a PCA, it is also possible to use other approaches to form the generative model, as illustrated with reference to the following figure.

FIG. 5

Figure 5:
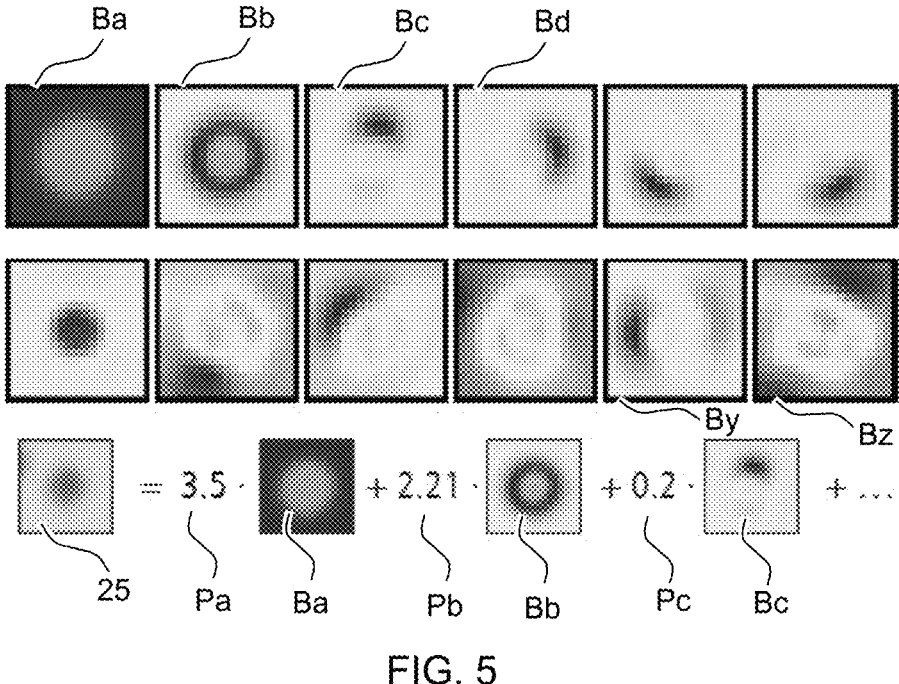
FIG. 5 illustrates processes of a generative model of example embodiments of methods according to the invention.

FIG. 5 schematically illustrates how the generative model of FIG. 3 can be formed by means of a non-negative matrix factorization (NMF) and how generated microscope images can then be produced. As with the PCA, a generated microscope image 25 is produced here as the sum of the products of the numerical values of parameters Pa, Pb, Pc, . . . and the respective basic component Ba-Bz.

The provided examples of a PCA and NMF are only for the purposes of illustration. It is in principle possible to use any other methods for forming a generative model, in particular deep neural networks. For example, a GAN can be used to learn a generator (generative model) that can produce a generated microscope image from an input parameter set that cannot be reliably distinguished from a microscope image of the training data by the discriminator of the GAN.

It is common to all types of generative models that an input parameter set defines the microscope image generated from that set. Together the parameters span a feature space whose dimensionality corresponds to the number of parameters. A point in the feature space indicates concrete numerical values of a parameter set. This is discussed in greater detail with reference to the following figure.

FIG. 6

Figure 6:
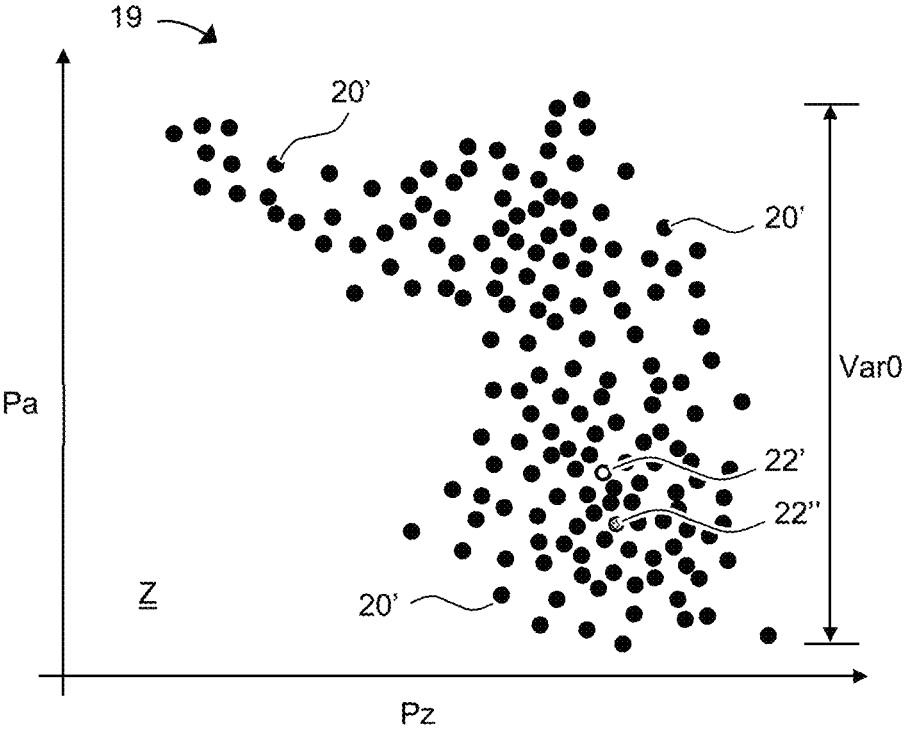
FIG. 6 illustrates a feature space of the generative model.
Figure 6:
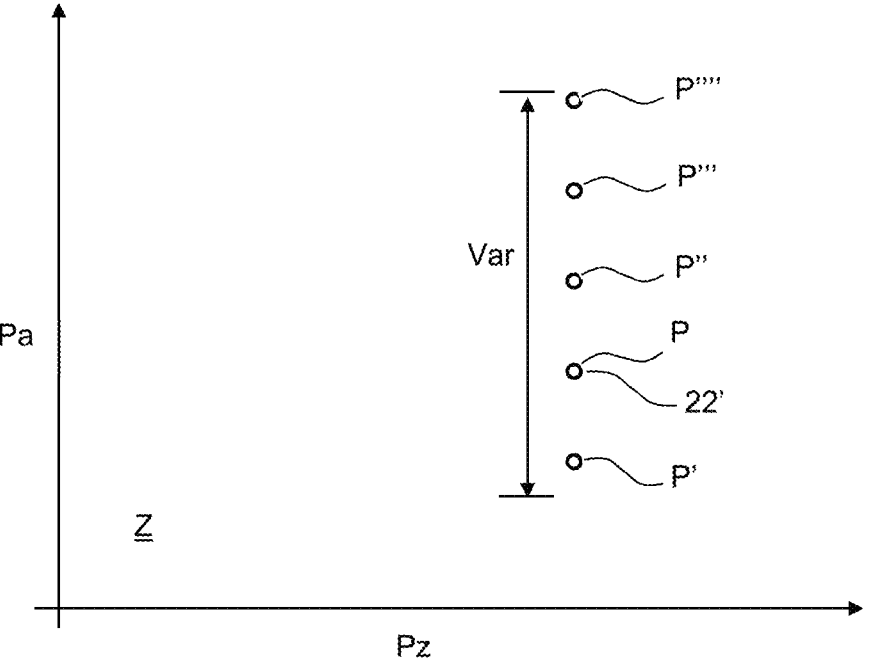

FIG. 6 shows an embedding 19 of the microscope images of the training data in a feature space Z of the generative model of FIG. 3. The generative model can in principle be formed in any manner. A point in the feature space Z is also referred to as a feature vector, parameter set or parameter configuration in the present disclosure. The microscope images of the training data are approximated by feature vectors 20', which are also referred to as latent code representations or embeddings of the microscope images.

The feature vectors 20', which are projections of the microscope images of the training data into the feature space Z, form a point cloud. In the case of a generative model in the form of a neural network, one of the feature vectors 20' can be ascertained, e.g., iteratively so that a difference between a microscope image generated therefrom and a microscope image of the training data is minimized.

For the parameter variation in the process V4 of FIG. 3, a (starting) parameter configuration that is characteristic of the training data can be selected. One of the feature vectors 20' can be interpreted as characteristic. Alternatively, characteristic can be understood to mean that the parameter values of a plurality of feature vectors 20' are averaged to form a feature vector 22' as the (starting) parameter configuration. It is also possible to select a central feature vector 22" among a plurality of feature vectors 20' as the starting parameter configuration. These approaches have the advantage that non-varied parameters have a value frequently found in reality, so that microscope images generated from the same lie within a statistical distribution of the microscope images of the training data.

The graph in the lower part of FIG. 6 shows the feature space Z of the generative model again, wherein a starting parameter configuration P is plotted. The starting parameter configuration P was ascertained as described above, e.g. by means of the feature vector 22' or 22". For the parameter variation of the process V4 shown in FIG. 3, the value of the parameter Pa is varied over a variation range Var so that multiple (varied) parameter configurations P', P", P''', P'''' are produced. In non-varied parameters, e.g. the parameter Pz, the parameter configurations P, P' to P'''' correspond to one another. The variation range Var is derived from the distribution of the feature vectors 20', i.e., from the embedding 19 of the microscope images of the training data. The variance in the parameter Pa found there, i.e., the parameter variation Var0 found in the training data, determines the variation range Var. For example, the variation range Var can be 90% of the parameter variation Var0 found in the training data. The values of the parameter Pa of all parameter configurations P, P' to P'''' thus lie within this parameter range. This ensures that the generated microscope images appear natural.

It is also possible to vary multiple parameters simultaneously. This is particularly advantageous when the distribution of feature vectors 20' is uneven. In this case, it is possible to choose a path through the feature space Z for which a plurality or in principle all of the parameters Pa-Pz are varied. The path can be chosen so as to run along regions with a high density of feature vectors 20'. Alternatively, the path can take the form of a line that approximates the point cloud of feature vectors 20'.

FIG. 7

Figure 7:
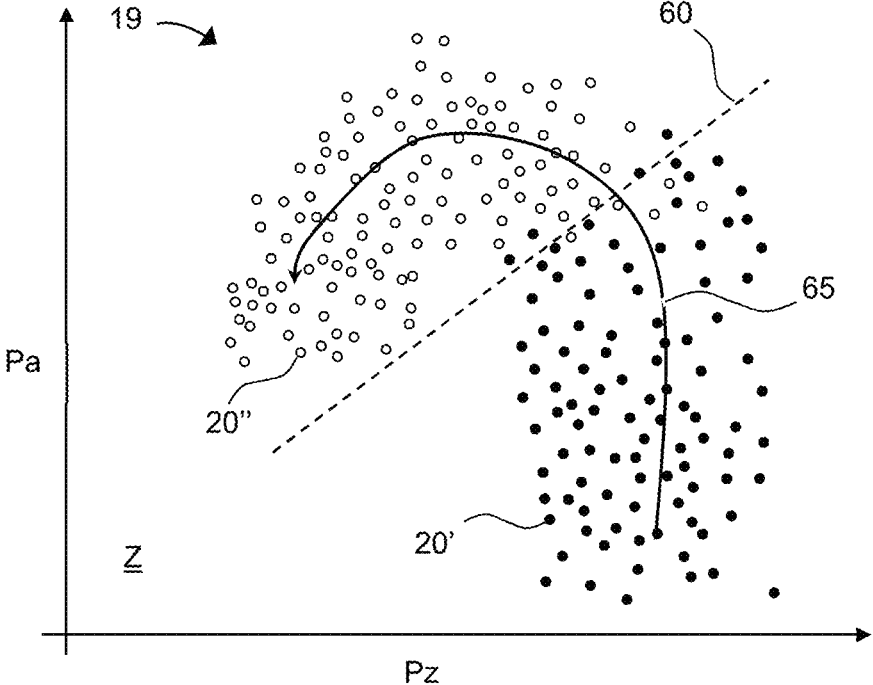
FIG. 7 illustrates a feature space of the generative model.

FIG. 7 illustrates an example of how a suitable joint variation of multiple parameters can be ascertained. FIG. 7 shows an embedding 19 of the microscope images of the training data in the feature space Z of the generative model. Feature vectors 20' and 20" of the microscope images are discriminated by the annotation (e.g. class designation) of the microscope images. For microscope images of the training data that have a first class designation, the associated feature vectors 20' are represented in FIG. 7 by solid circles. For microscope images that have a different, second class designation, on the other hand, the associated feature vectors 20" are represented in FIG. 7 by hollow circles.

A separating line (or separating hyperplane) 60 can be ascertained in the feature space Z by means of which the feature vectors 20', 20" are separated as accurately as possible according to their class designation. This can occur mathematically, e.g., by means of a (linear) discriminant analysis (LDA). A variation path can be defined so as to be transverse or perpendicular to the separating line 60.

In particular, a variation path 65 through the feature space Z can be chosen as illustrated so that the variation path 65 traces the distribution of the feature vectors 20', 20" in a manner that is as representative as possible, running from the feature vectors 20' of one class to the feature vectors 20" of the other class.

Multiple parameters Pa-Pz are modified simultaneously for such a variation path 65. With multiple parameter configurations along the variation path 65, generated microscope images are produced that form a series. Since a class transition occurs within this series, the image processing model should exhibit a high sensitivity to this parameter variation. By taking into account the class designations in the determination of the variation path 65, a series of generated microscope images for which a high sensitivity of the image processing model should be established can be produced in a targeted manner. If a high sensitivity is not established, a warning can be issued or the image processing model can be graded as inadequate.

FIG. 8

Figure 8:
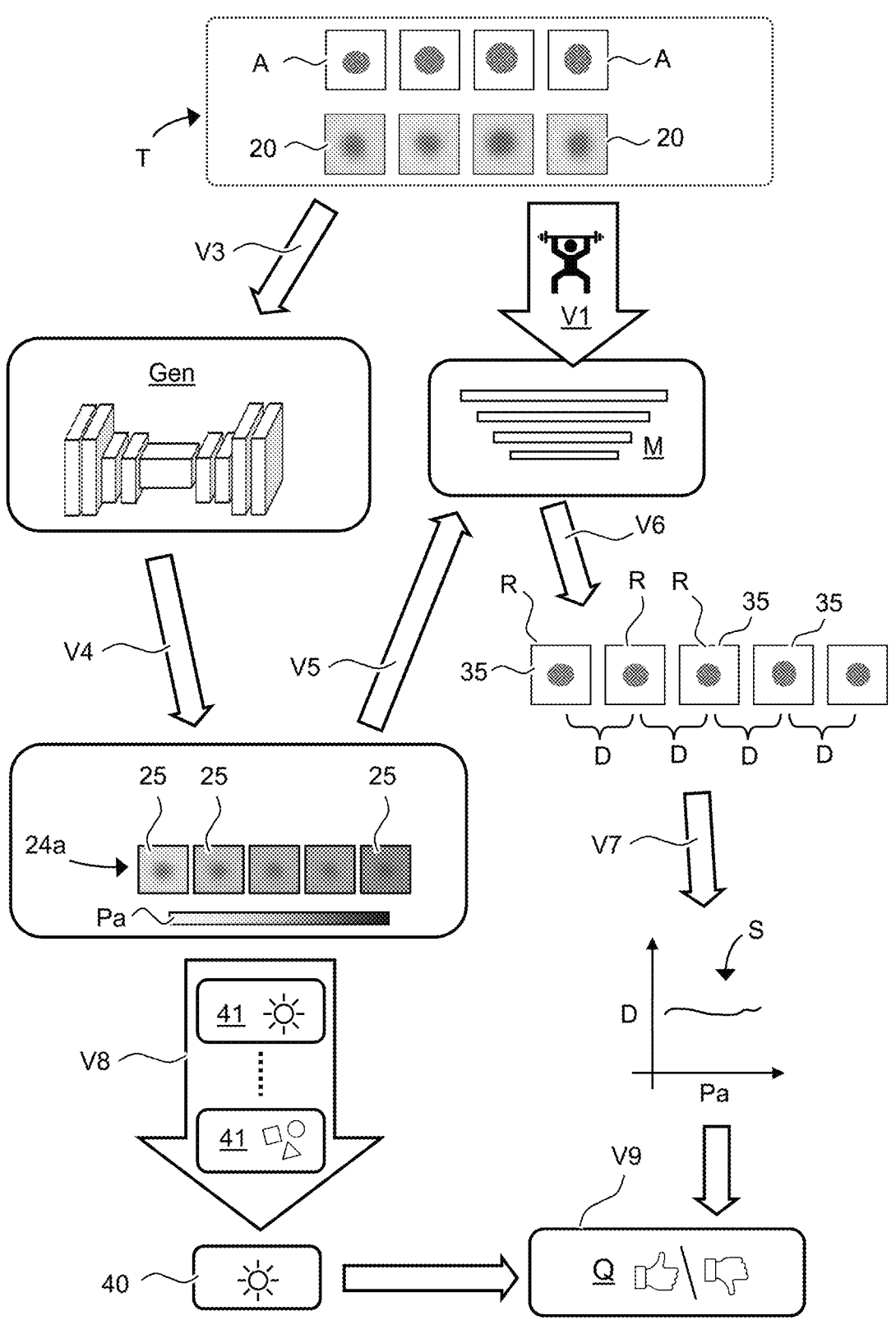
FIG. 8 illustrates processes of a further example embodiment of a method according to the invention.

With reference to FIG. 8, an example embodiment of a method according to the invention is described, which is a variant of the embodiment of FIG. 3. In contrast to FIG. 3, the image processing model M is not a classification model but a segmentation model. Moreover, the model outputs are entered together into a calculation whose results serve to ascertain the sensitivity of the image processing model M. In detail:

The microscope images 20 of the training data T comprise annotations A in the form of segmentation masks. In the segmentation masks, different pixel values designate different classes, e.g. "object" and "non-object/background". By means of this training data T, the image processing model M learns to calculate a segmentation mask 35 as an image processing result R from an input microscope image.

Using the microscope images 20, a generative model Gen is learned in a process V3. In a process V4, starting from a parameter set, the value of at least one parameter is varied in order to produce different parameter sets, which are then input into the generative model Gen so as to produce a series 24a of generated microscope images 25. Each of the generated microscope images 25 of the series 24a is input into the image processing model M, which respectively calculates an associated segmentation mask 35 as an image processing result R.

Next, a degree of difference D between the segmentation masks 35 is calculated. In particular, the degree of difference D can be respectively calculated between two segmentation masks 35 and take the form of a number, e.g. by calculating the sum of the pixel differences between the two segmentation masks 35. The degree of difference D can also capture a difference in the shape, size, area or boundaries of a segmented region. More precise calculations are in principle possible when each segmentation mask 35 indicates a probability of a classification per pixel. The probability can be expressed by any value in a predefined range of values, whereby a more precise prediction is possible compared to, e.g., a segmentation mask 35 in the form of a binary mask.

The degree of difference D can be calculated between respectively adjacent segmentation masks 35, i.e., between segmentation masks 35 whose associated values of the at least one varied parameter have the smallest difference. Alternatively, it is also possible for the degree of difference D to always be calculated in relation to a segmentation mask 35 selected as a reference, wherein in principle any of the segmentation masks 35 can be used as a reference.

The degree of difference D as a function of the at least one varied parameter Pa is ascertained as a sensitivity S in a process V7. Optionally, a visual display occurs, e.g. in the form of a graph, as shown in FIG. 8. In this example, the degree of difference D between the segmentation masks 35 is close to zero over the entire range of values of the varied parameter Pa. This means that the image processing model M calculates the segmentation masks 35 independently of the value of the parameter Pa, i.e., independently of the background brightness in (generated) microscope images 20, 25.

Whether an ascertained sensitivity S to a certain parameter Pa-Pz is desired or not can be evaluated manually by a user. The ascertained sensitivity S can be displayed for this purpose together with the associated generated microscope images 25 of the corresponding series 24a. From the microscope images 25, the user can estimate the effect of the varied parameter Pa on the generated microscope images 25 (this is referred to as parameter semantics in the following). This allows the user to evaluate whether or not the ascertained sensitivity S is desired for the parameter semantics in question.

As symbolized in a process V8 of FIG. 8, it is also possible for a parameter semantics 40 to be ascertained automatically by image analysis. To this end it is ascertained how the generated microscope images 25 of a series 24a differ from one another. For known parameter semantics 41, it is stored how associated differences appear in (generated) microscope images 25 so that it is possible to ascertain whether a varied parameter Pa corresponds to the known parameter semantics.

For example, a known parameter semantics 41 can indicate a background brightness. A stored image analysis rule provides that an average pixel brightness is calculated for image regions of a microscope image 25 that have been estimated to constitute a background with a sufficiently high probability. If a difference between these average pixel brightnesses of different generated microscope images 25 of the same series 24a exceeds a predefined minimum value, it is inferred that the varied parameter influences the background brightness.

In cases where the parameter semantics 40 for a varied parameter Pa is ascertained automatically, a further automatic analysis of the sensitivity S can follow. It can be stored for the known parameter semantics 41 which sensitivity S is acceptable or whether a warning is to be issued. For example, for a known parameter semantics 41, it can be stored that, as the parameter Pa increases, the degree of difference D should increase, decrease, change monotonically, cover a predefined minimum interval or be constant within predefined limits.

In a process V9, the ascertained sensitivity S, i.e., the degree of difference D dependent on the varied parameter Pa, is tested as a function of the associated ascertained semantics 40. For this purpose, intended sensitivities can be available for different known or predefined parameter semantics 41. A comparison is conducted to test if the sensitivity S of the ascertained semantics 40 corresponds to the intended sensitivity. A quality Q of the image processing model M can be output as a test result. The quality Q can indicate an aptness of the image processing model M. In the illustrated example, it was ascertained that the image processing model M performs a sample segmentation independently of the background brightness, as desired. If an ascertained sensitivity to other varied parameters also yields a positive result together with the associated parameter semantics in the process V9, it is inferred that an overall quality Q of the image processing model M is high. Otherwise, a warning can be issued.

The function of the image processing model M as a segmentation model is described for the purposes of illustration only. Other functions are listed in greater detail Zin the foregoing general description.

FIG. 9

Figure 9:
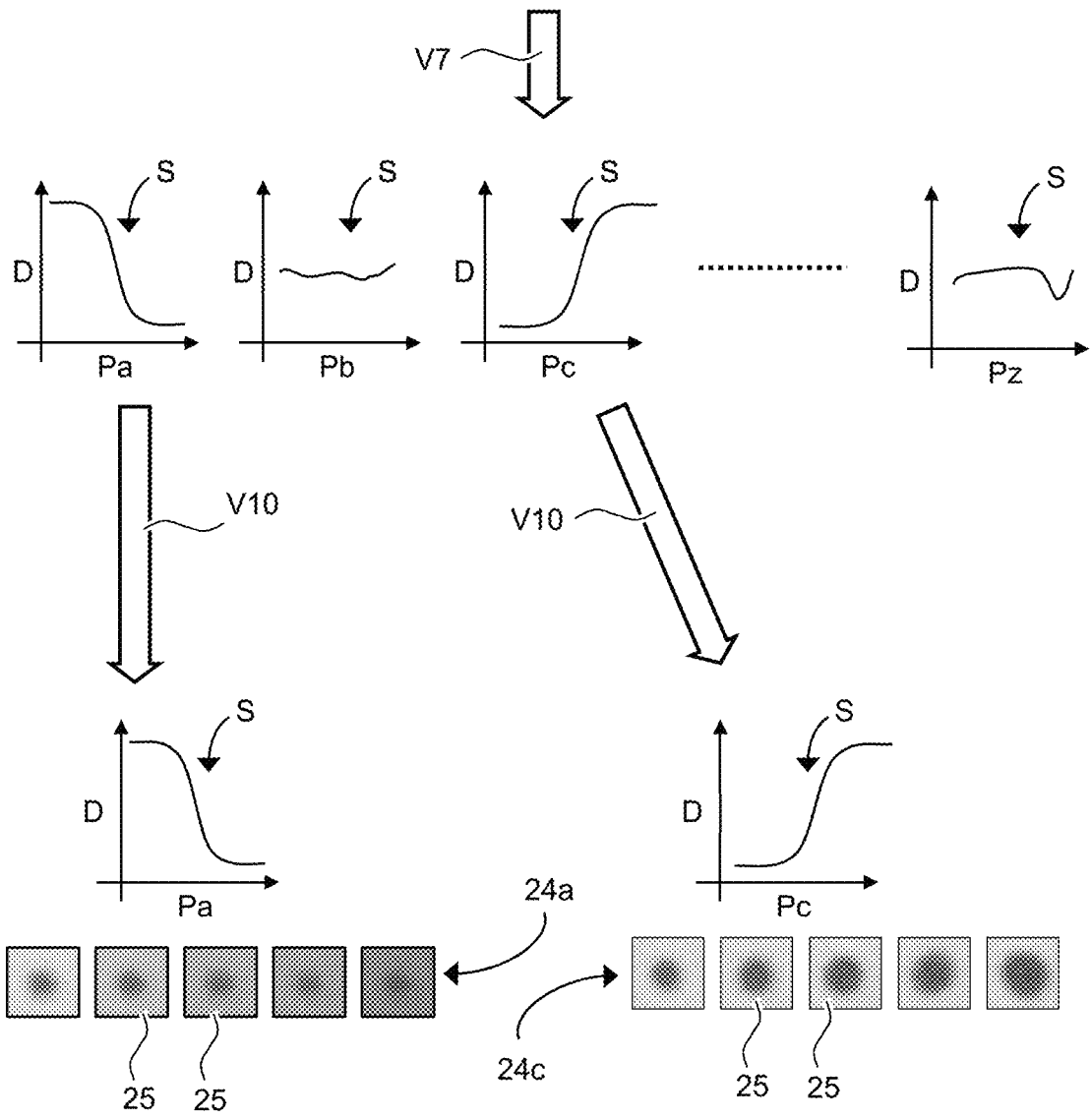
FIG. 9 illustrates further processes of example embodiments of methods according to the invention.

FIG. 9 shows processes that can complement the example embodiments described up to this point.

In a process V7, it is possible to ascertain the sensitivity S of the image processing model to variations in the majority of—in particular all—parameters Pa-Pz.

It is then ascertained in relation to which of the parameters Pa-Pz the sensitivity S is maximal. In the present example, this is the case for the parameters Pa and Pc. These parameters Pa and Pc are selected for further analysis (process V10). For example, the associated microscope images 25 of the corresponding series 24a or 24c can be displayed on a screen together with the graphs of the degrees of difference D and/or evaluated automatically. It can in particular be checked whether these parameters Pa, Pc are the factors that are known to be discriminating for the defined task of the image processing model M.

The variants described in relation to the different figures can be combined with one another. The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage/microscope stage
7 Sample carrier
9 Microscope camera
9A Overview camera
9B Mirror
9C Field of view of the overview camera
10 Computing device
11 Computer program
12 Eyepiece
19 Embedding of the microscope images in the feature space of the generative model
20 Microscope image, in particular of the training data
20', 20" Feature vector corresponding to a representation of a microscope image in the feature space of the generative model
21 Microscope image of the validation data
22', 22" Averaged or centroid feature vector as (starting) parameter configuration for the parameter variation
24a-24z Series of generated microscope images
25 Generated microscope image
30 Feature vector of a microscope image
35 Segmentation mask calculated by the image processing model M
40 Parameter semantics ascertained using microscope images
41 Known parameter semantics
50 Validation result
60 Separating line between feature vectors depending on their annotation/class membership
65 Variation path through the feature space of the generative model
100 Microscopy system
A Annotations for the microscope images
Ba-Bz Basic components of a generative model
C Class designation as example image processing result of the image processing model
C1, C2 Class designations as example annotations
D Degree of difference between image processing results
D1, D2, D3 Measurement days
F1, F2 Features
Gen Generative model
i1, i2, i3 Islands of feature vectors in a dimensionally reduced feature space
M Image processing model
P Parameter set/parameter configuration
P'-P"" Parameter configurations produced by varying at least one parameter
Pa-Pz Parameters input into the generative model Gen
Q Quality of an image processing model ascertained based on the sensitivity and at least one parameter semantics
R Image processing result calculated by the image processing model from a (generated) microscope image
S Sensitivity
T Training data comprising microscope images
V1-V10 Processes of a method according to the invention
Var Variation range of a varied parameter
Var0 Parameter variation found in the microscope images of the training data
Z Feature space of the generative model

What is claimed is:

1. A computer-implemented method for testing a sensitivity of an image processing model, comprising:

training the image processing model using training data comprising microscope images so that the image processing model is configured to calculate an image processing result from an input microscope image;

forming a generative model from the training data so that the generative model is configured to produce a generated microscope image from an input parameter set;

producing a series of generated microscope images with the generative model by varying at least one parameter of the parameter set;

calculating image processing results from each of the generated microscope images using the image processing model; and ascertaining a sensitivity of the image processing model to the at least one parameter of the parameter set input into the generative model based on differences between the image processing results.

2. The method according to claim 1, further comprising:

defining a parameter configuration which, when entered into the generative model, produces a generated microscope image characteristic of the training data;

wherein the producing of a series of generated microscope images comprises varying at least one of the parameters of the ascertained parameter configuration a number of times and inputting parameter sets produced in this manner into the generative model.

3. The method according to claim 2, wherein a feature vector that corresponds to a representation of one of the microscope images of the training data in a feature space of the generative model is selected as the parameter configuration; or wherein an average of a plurality of feature vectors that correspond to representations of a plurality of microscope images of the training data in the feature space of the generative model is calculated and this average is used as the parameter configuration.

4. The method according to claim 1, wherein a variation range of the at least one parameter is set at a value that covers at least 70% of a parameter variation found in the microscope images of the training data.

5. The method according to claim 1, wherein the generative model is used to produce a plurality of series of generated microscope images, wherein the series differ in which of the parameters are varied, wherein image processing results are calculated from the generated microscope images of all series;

wherein the parameters in relation to which the image processing model has a greatest sensitivity are identified based on the sensitivities.

6. The method according to claim 1, further comprising:

ascertaining a parameter semantics using the series of generated microscope images, wherein the parameter semantics specifies a microscope image characteristic that is changed by varying the at least one parameter; and testing the image processing model based on the sensitivity of the image processing model to the at least one parameter and based on the associated parameter semantics.

7. The method according to claim 6, wherein it is respectively stored for a plurality of known parameter semantics which effects the parameter semantics have on generated microscope images;

wherein the known parameter semantics relate to one or more of the following: sample size, sample shape, sample orientation, sample brightness, sample brightness gradient, sample position, sample number, sample texture, background brightness, background brightness gradient, depicted background structures, artefacts, contaminations, image distortions, reflections, or geometric characteristics of sample carrier components;

wherein a parameter semantics is ascertained by establishing whether differences between the generated microscope images of the same series correspond precisely to effects of one of the known parameter semantics.

8. The method according to claim 1, wherein the sensitivity of the image processing model to the at least one parameter is ascertained in the form of a degree of difference between the image processing results calculated from the generated microscope images produced by varying the at least one parameter.

9. The method according to claim 1, further comprising:

defining an intended sensitivity of the image processing model to parameters of a predefined parameter semantics;

carrying out a comparison to determine whether an ascertained sensitivity of one or more parameters whose ascertained parameter semantics matches the predefined parameter semantics corresponds to the intended sensitivity; and issuing a warning if the ascertained sensitivity does not correspond to the intended sensitivity.

10. The method according to claim 1, further comprising:

using the ascertained sensitivity for categorizing whether or not the associated varied parameter is a discriminating factor for calculating the image processing result;

ascertaining a respective parameter semantics for parameters based on the series of generated microscope images produced by varying the corresponding parameter;

wherein specifications are stored for different known parameter semantics indicating whether associated parameters should be a discriminating factor for calculating the image processing result;

checking whether there is a contradiction between a parameter categorized as a discriminating factor and a specification stored for the corresponding parameter semantics; and outputting a warning in the event of a contradiction.

11. The method according to claim 10, wherein the known parameter semantics comprise one or more of the following: a background brightness; an image or background sharpness; an image noise; a geometry, number or size of depicted objects; a texture of depicted objects; contaminations, artefacts or reflections;

wherein the specifications indicate for each known parameter semantics whether the known parameter semantics should be a discriminating factor for calculating the image processing result.

12. The method according to claim 1, wherein, in the event of a contradiction between a parameter categorized as a discriminating factor and a specification stored for the corresponding parameter semantics, an augmentation of the training data is recommended for the parameter categorized as a discriminating factor.

13. The method according to claim 1, further comprising:

ascertaining whether a parameter categorized as a discriminating factor represents textures or geometries of depicted objects in generated microscope images.

14. The method according to claim 1, wherein an augmentation of the training data is recommended as a function of the sensitivity of the image processing model.

15. The method according to claim 1, further comprising:

verifying based on the sensitivity that parameters that cause less variance in the generated microscope images also influence the image processing result less; or identifying parameters for which a similar sensitivity is ascertained and estimating a plausibility of the similar sensitivity using a comparison of the generated microscope images produced during the variation of the identified parameters.

16. A microscopy system including:

a microscope for image capture; and a computing device configured to execute the computer-implemented method according to claim 1.

17. A computer program, comprising commands which are stored on a non-transitory computer-readable medium and which, when the program is executed by a computer, cause the execution of the method according to claim 1.

18. A microscopy system including:

a microscope for image capture; and a computing device configured to test a sensitivity of an image processing model by:

training the image processing model using training data comprising microscope images so that the image processing model is configured to calculate an image processing result from an input microscope image;

forming a generative model from the training data so that the generative model is configured to produce a generated microscope image from an input parameter set;

producing a series of generated microscope images with the generative model by varying at least one parameter of the parameter set;

defining a parameter configuration which, when entered into the generative model, produces a generated microscope image characteristic of the training data;

wherein the producing of the series of generated microscope images comprises varying at least one of the parameters of the ascertained parameter configuration a number of times and inputting parameter sets produced in this manner into the generative model;

wherein a feature vector that corresponds to a representation of one of the microscope images of the training data in a feature space of the generative model is selected as the parameter configuration, or an average of a plurality of feature vectors that correspond to representations of a plurality of microscope images of the training data in the feature space of the generative model is calculated and this average is used as the parameter configuration;

calculating image processing results from each of the generated microscope images using the image processing model; and ascertaining a sensitivity of the image processing model to the at least one parameter based on differences between the image processing results.

19. A microscopy system including:

a microscope for image capture; and a computing device configured to test a sensitivity of an image processing model by:

training the image processing model using training data comprising microscope images so that the image processing model is configured to calculate an image processing result from an input microscope image;

forming a generative model from the training data so that the generative model is configured to produce a generated microscope image from an input parameter set;

producing a series of generated microscope images with the generative model by varying at least one parameter of the parameter set;

calculating image processing results from each of the generated microscope images using the image processing model;

ascertaining a sensitivity of the image processing model to the at least one parameter based on differences between the image processing results;

defining an intended sensitivity of the image processing model to parameters of a predefined parameter semantics;

carrying out a comparison to determine whether an ascertained sensitivity of one or more parameters whose ascertained parameter semantics matches the predefined parameter semantics corresponds to the intended sensitivity; and issuing a warning if the ascertained sensitivity does not correspond to the intended sensitivity.

20. The microscopy system according to claim 19, wherein the computing device is further configured to:

use the ascertained sensitivity for categorizing whether or not the associated varied parameter is a discriminating factor for calculating the image processing result;

ascertain a respective parameter semantics for parameters based on the series of generated microscope images produced by varying the corresponding parameter;

wherein specifications are stored for different known parameter semantics indicating whether associated parameters should be a discriminating factor for calculating the image processing result;

check whether there is a contradiction between a parameter categorized as a discriminating factor and a specification stored for the corresponding parameter semantics; and output a warning in the event of a contradiction.

* * * * *